US012633669B2

(12) United States Patent
Okita et al.

(10) Patent No.: US 12,633,669 B2
(45) Date of Patent: May 19, 2026

(54) INTELLIGENT REFLECTING SURFACE

(71) Applicant: Japan Display Inc., Tokyo (JP)

(72) Inventors: Mitsutaka Okita, Tokyo (JP); Shinichiro Oka, Tokyo (JP); Shigesumi Araki, Tokyo (JP); Daiichi Suzuki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 86 days.

(21) Appl. No.: 18/531,751

(22) Filed: Dec. 7, 2023

(65) Prior Publication Data

US 2024/0128652 A1 Apr. 18, 2024

Related U.S. Application Data

(63) Continuation of application No. PCT/JP2022/019637, filed on May 9, 2022.

(30) Foreign Application Priority Data

Jun. 9, 2021 (JP) ................................ 2021-096632

(51) Int. Cl.
*H01Q 15/00* (2006.01)
*H01Q 15/14* (2006.01)
*H01Q 17/00* (2006.01)

(52) U.S. Cl.
CPC ......... *H01Q 15/0013* (2013.01); *H01Q 15/14* (2013.01); *H01Q 17/00* (2013.01)

(58) Field of Classification Search
CPC .... H01Q 15/0013; H01Q 15/14; H01Q 17/00; H01Q 21/065
See application file for complete search history.

(56) References Cited

U.S. PATENT DOCUMENTS

| | | | | |
|---|---|---|---|---|
| 2018/0083364 | A1 | 3/2018 | Foo | |
| 2020/0388934 | A1* | 12/2020 | Misaki | H10D 30/67 |
| 2022/0384961 | A1* | 12/2022 | Chang | H01Q 15/148 |
| 2024/0106132 | A1* | 3/2024 | Okita | H01Q 15/148 |
| 2024/0322428 | A1* | 9/2024 | Suzuki | H01Q 3/46 |
| 2024/0322429 | A1* | 9/2024 | Suzuki | H01Q 15/148 |

FOREIGN PATENT DOCUMENTS

| | | | |
|---|---|---|---|
| JP | H11-103201 | A | 4/1999 |
| JP | 2019-530387 | A | 10/2019 |

OTHER PUBLICATIONS

International Search Report and Written Opinion mailed on Jul. 19, 2022, received for PCT Application PCT/JP2022/019637, filed on May 9, 2022, 08 pages including English Translation.

* cited by examiner

*Primary Examiner* — Daniel Munoz
(74) *Attorney, Agent, or Firm* — XSENSUS LLP

(57) ABSTRACT

According to one embodiment, an intelligent reflecting surface includes a first substrate, a second substrate, a sealing material, a liquid crystal layer, and a radar absorbent material. The first substrate includes a first basement located in a first area and a second area, and a plurality of patch electrodes. The second substrate includes a second basement and a common electrode. The radar absorbent material is located in the second area.

10 Claims, 15 Drawing Sheets

INTELLIGENT REFLECTING SURFACE

CROSS-REFERENCE TO RELATED APPLICATIONS

This application is a Continuation Application of PCT Application No. PCT/JP2022/019637, filed May 9, 2022 and based upon and claiming the benefit of priority from Japanese Patent Application No. 2021-096632, filed Jun. 9, 2021, the entire contents of all of which are incorporated herein by reference.

FIELD

Embodiments described herein relate generally to an intelligent reflecting surface.

BACKGROUND

Phase shifters using liquid crystal have been developed as phase shifters for use in phased array antennas whose directivity can be electrically controlled. In a phased array antenna, a plurality of antenna elements to which high-frequency signals are transmitted from corresponding phase shifters are arranged one-dimensionally (or two-dimensionally). In the phased array antenna as described above, the dielectric constant of the liquid crystal needs to be adjusted such that the phase difference between the high-frequency signals input to adjacent antenna elements becomes constant.

In addition, intelligent reflecting surfaces capable of controlling a direction of radio wave reflection using the liquid crystal, similarly to the phased array antennas, has been studied. On this intelligent reflecting surface, reflection controllers including reflecting electrodes are arranged one-dimensionally (or two-dimensionally). On the intelligent reflecting surface, the dielectric constant of the liquid crystal also needs to be adjusted such that a phase difference between reflected radio waves becomes constant between the adjacent reflection controllers.

DETAILED DESCRIPTION

Figure 1:
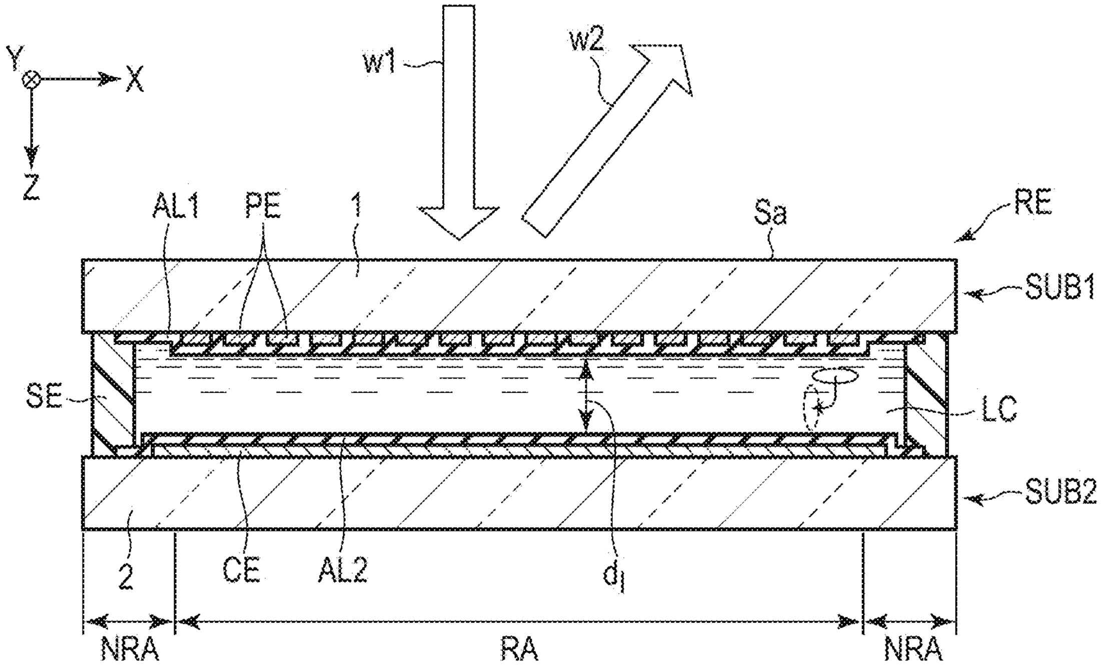
FIG. 1 is a cross-sectional view showing an intelligent reflecting surface according to a first embodiment.

In general, according to one embodiment, there is provided an intelligent reflecting surface comprising: a first substrate; a second substrate; a sealing material bonding the first substrate with the second substrate; a liquid crystal layer held between the first substrate and the second substrate and surrounded by the sealing material; and a radar absorbent material, wherein the first substrate includes a first basement having a first main surface and a second main surface on a side opposite to the first main surface and located in a first area and a second area outside the first area, and a plurality of patch electrodes located in the first area, opposed to the first main surface, and arrayed in a matrix and spaced apart at intervals along each of an X-axis and a Y-axis orthogonal to each other, the second substrate includes a second basement having a third main surface opposed to the first main surface and a fourth main surface on a side opposite to the third main surface and located in the first area and the second area, and a common electrode located in the first area, provided between the first substrate and the third main surface, and opposed to the plurality of patch electrodes in a direction parallel to a Z-axis orthogonal to each of the X-axis and the Y-axis, the sealing material is located in the second area, and the radar absorbent material is located in the second area.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented, but such schematic illustration is merely exemplary, and in no way restricts the interpretation of the invention. Besides, in the specification and drawings, the same elements as those described in connection with preceding drawings are denoted by like reference numbers, and a detailed description thereof is omitted unless necessary.

First Embodiment

First, a first embodiment will be described. FIG. 1 is a cross-sectional view showing an intelligent reflecting surface RE according to the present embodiment. The intelligent reflecting surface RE can reflect radio waves and functions as a relay device for radio waves.

As shown in FIG. 1, the intelligent reflecting surface RE comprises a first substrate SUB1, a second substrate SUB2, and a liquid crystal layer LC. The first substrate SUB1 includes an electrically insulating basement 1, a plurality of patch electrodes PE, and an alignment film AL1. The basement 1 serving as a first basement is formed in a flat plate shape and extends along an X-Y plane including an X-axis and a Y-axis that are orthogonal to each other. The alignment film AL1 covers the plurality of patch electrodes PE.

The second substrate SUB2 is opposed to and spaced from the first substrate SUB1 with a predetermined gap. The second substrate SUB2 includes an electrically insulating basement 2, a common electrode CE, and an alignment film AL2. The basement 2 serving as a second basement is formed in a flat plate shape and extends along the X-Y plane. The basement 1 and the basement 2 are formed of glass. However, the basement 1 and the basement 2 may be formed of an insulating material other than glass, such as resin.

The common electrode CE is opposed to the plurality of patch electrodes PE in a direction parallel to the Z-axis orthogonal to each of the X-axis and the Y-axis. A plurality of patch electrodes PE, the common electrode CE, and the like are located in a reflective area RA. The alignment film AL2 covers the common electrode CE. In the present embodiment, each of the alignment film AL1 and the alignment film AL2 is a horizontal alignment film.

The first substrate SUB1 and the second substrate SUB2 are joined by sealing materials SE arranged on their respective peripheral edges. The sealing material SE is located in the non-reflective area NRA outside the reflective area RA. The liquid crystal layer LC is provided in a space surrounded by the first substrate SUB1, the second substrate SUB2, and the sealing materials SE. The liquid crystal layer LC is held between the first substrate SUB1 and the second substrate SUB2. The liquid crystal layer LC is opposed to the plurality of patch electrodes PE on one hand and opposed to the common electrode CE on the other hand.

A thickness (cell gap) of the liquid crystal layer LC is referred to as $d_1$. The thickness $d_1$ is larger than the thickness of the liquid crystal layer of a normal liquid crystal display panel, for example, approximately 5 to 20 times that of a normal liquid crystal display device. In the present embodiment, the thickness $d_1$ is 50 μm. However, the thickness $d_1$ may be less than 50 μm as long as the reflection phase of radio waves can be sufficiently adjusted. Alternatively, the thickness $d_1$ may exceed 50 μm in order to increase the reflection angle of radio waves. The liquid crystal material used for the liquid crystal layer LC of the intelligent reflecting surface RE is different from the liquid crystal material used for an ordinary liquid crystal display panel. The above-described reflection phase of the radio waves will be described later.

A common voltage is applied to the common electrode CE, and the potential of the common electrode CE is fixed. In the present embodiment, the common voltage is 0 V. A voltage is also applied to the patch electrodes PE. In the present embodiment, the patch electrodes PE are AC-driven. The liquid crystal layer LC is driven by a so-called longitudinal electric field. A voltage applied between the patch electrodes PE and the common electrode CE acts on the liquid crystal layer LC, thereby changing the dielectric constant of the liquid crystal layer LC.

When the dielectric constant of the liquid crystal layer LC changes, the propagation speed of radio waves in the liquid crystal layer LC also changes. For this reason, the reflection phase of radio waves can be adjusted by adjusting the voltage applied to the liquid crystal layer LC. As a result, the reflection direction of radio waves can be adjusted. In the present embodiment, an absolute value of the voltage applied to the liquid crystal layer LC is 10 V or less. This is because the dielectric constant of the liquid crystal layer LC is saturated at 10 V. However, the absolute value of the voltage applied to the liquid crystal layer LC may exceed 10 V. For example, when improvement of the response speed of the liquid crystal is required, a voltage of 10 V or less may be applied to the liquid crystal layer LC after a voltage exceeding 10 V is applied to the liquid crystal layer LC.

The first substrate SUB1 has an incidence surface Sa on the side opposite to the side opposed to the second substrate SUB2. In the figure, an incident wave w1 is a radio wave made incident on the intelligent reflecting surface RE, and a reflected wave w2 is a radio wave reflected on the intelligent reflecting surface RE.

Figure 2:
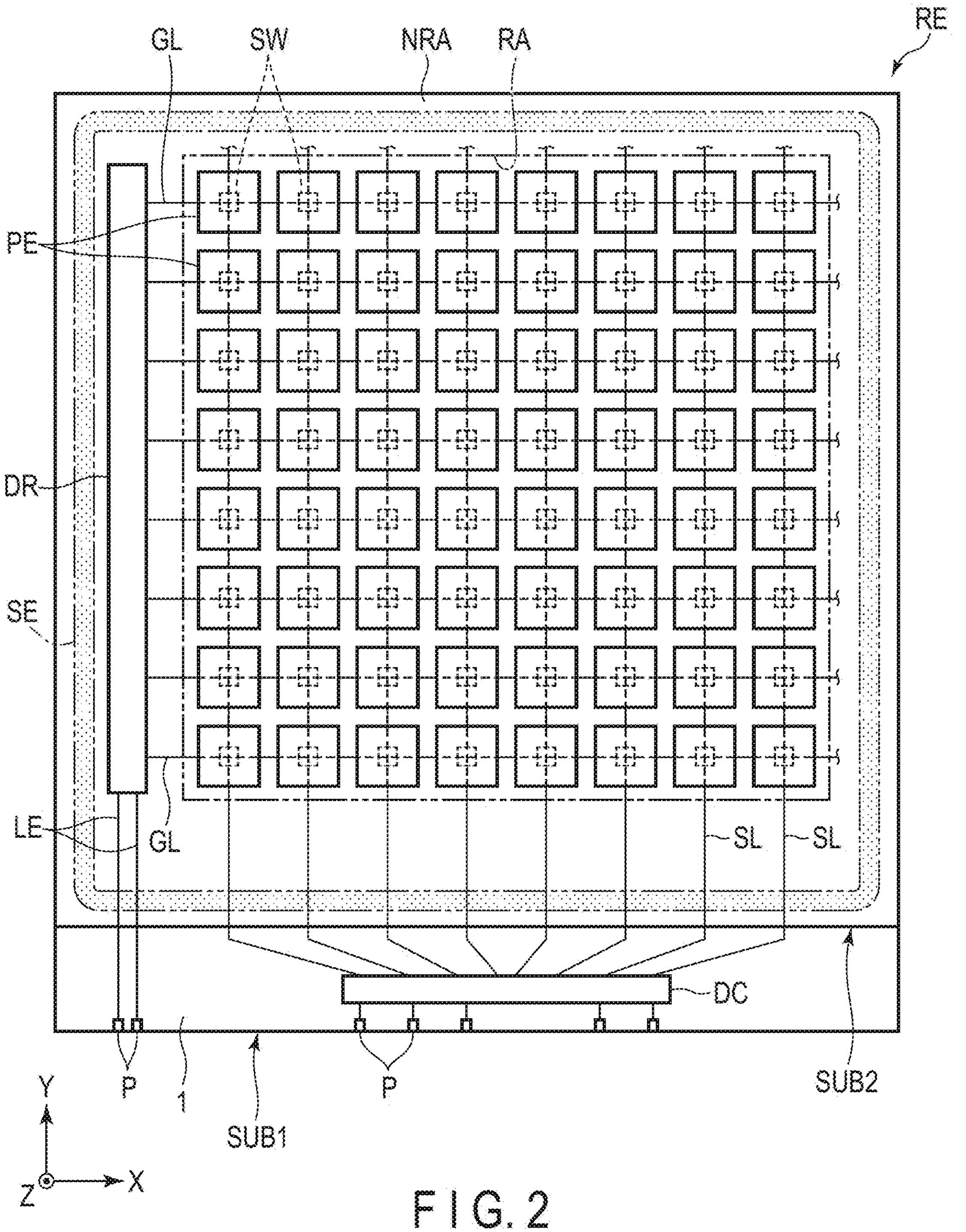
FIG. 2 is a plan view showing the intelligent reflecting surface shown in FIG. 1.

FIG. 2 is a plan view showing the intelligent reflecting surface RE shown in FIG. 1. In the drawing, a dot pattern is attached to a sealing material SE.

As shown in FIG. 2, the plurality of patch electrodes PE are arranged in a matrix at intervals along each of the X-axis and the Y-axis. In the X-Y plane, the plurality of patch electrodes PE have the same shape and the same size.

The plurality of patch electrodes PE are located in the reflective area RA, arranged at regular intervals along the X-axis, and arranged at regular intervals along the Y-axis. The first substrate SUB1 includes a plurality of signal lines SL, a plurality of control lines GL, a plurality of switching elements SW, a drive circuit DR, and a plurality of lead lines LE.

A drive circuit DC is mounted on an area of the first substrate SUB1, which is not opposed to the second substrate SUB2. The drive circuit DC is composed of an integrated circuit. The drive circuit DC is connected to pads p of outer lead bonding (OLB).

The plurality of signal lines SL extend along a Y-axis and are arranged in a direction along an X-axis. The signal lines SL are connected to a drive circuit DC. The plurality of control lines GL extend along the X-axis and are arranged in a direction along the Y-axis. The signal lines SL and the control lines GL extend in a reflective area RA and a non-reflective area NRA. The drive circuit DR is located in the non-reflective area NRA. The plurality of control lines GL are connected to the drive circuit DR.

The switching element SW is provided near an intersection of one signal line SL and one control line GL, and is electrically connected to one signal line SL and one control line GL. The plurality of lead lines LE are connected to the drive circuit DR on one side and to a pad p of OLB on the other side. The lead lines LE may be connected to the drive circuit DC. The patch electrodes PE, the signal lines SL, the control lines GL, and the common electrode CE are formed of metal or a conductor equivalent to metal.

The conductor of the patch electrodes PE, the common electrode CE, and the like may be formed of so-called TAT or MAM.

When the patch electrodes PE are formed of TAT, the patch electrodes PE adopt a three-layer stacked structure (Ti-based/Al-based/Ti-based). The patch electrode PE includes a lower layer formed of a metal material containing Ti as a main component such as titanium (Ti) or an alloy containing Ti, an intermediate layer formed of a metal material containing Al as a main component such as aluminum (Al) or an alloy containing Al, and an upper layer formed of a metal material containing Ti as a main component such as Ti or an alloy containing Ti.

When the patch electrodes PE are formed of MAM, the patch electrodes PE adopt a three-layer stacked structure (Mo-based/Al-based/Mo-based). The patch electrode PE includes a lower layer formed of a metal material containing Mo as a main component such as Mo or an alloy containing Mo, an intermediate layer formed of a metal material containing Al as a main component such as Al or an alloy containing Al, and an upper layer formed of a metal material containing Mo as a main component such as Mo or an alloy containing Mo.

For example, the patch electrodes PE, the signal lines SL, and the control lines GL may be formed of a transparent conductive material such as indium tin oxide (ITO).

The sealing material SE is located in the non-reflective area NRA, and arranged at a peripheral edge of the area where the first substrate SUB1 and the second substrate SUB2 are opposed to each other. Incidentally, the above-described liquid crystal layer LC is formed by a drop injection method, but may be formed by a liquid crystal injection method using a capillary action. In the latter case, a liquid crystal injection port is formed in the sealing material SE, and a liquid crystal material is injected from the liquid crystal injection port into a space surrounded by the first substrate SUB1, the second substrate SUB2, and the sealing material SE, and the liquid crystal injection port is sealed with a sealing material.

FIG. 2 shows an example in which eight patch electrodes PE are arranged in the direction along the X-axis and the direction along the Y-axis. However, the number of patch electrodes PE can be variously modified. For example, hundred patch electrodes PE may be arranged in the direction along the X-axis, and a plurality of (for example, hundred) patch electrodes PE may be arranged in the direction along the Y-axis. A length of the intelligent reflecting surface RE (first substrate SUB1) in the direction along the X-axis is, for example, 40 to 80 cm.

Figure 3:
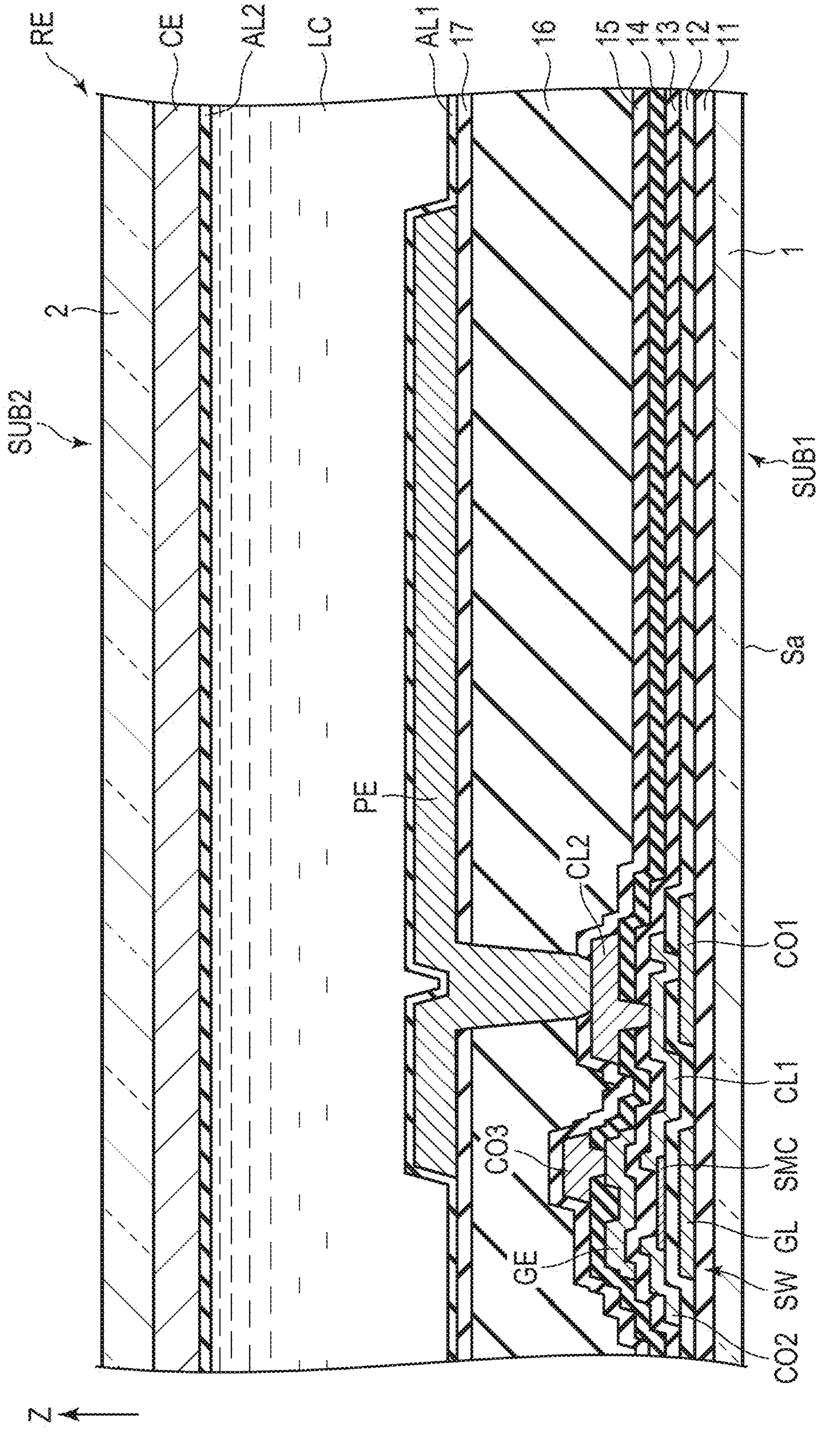
FIG. 3 is an enlarged cross-sectional view showing a part of the intelligent reflecting surface.

FIG. 3 is an enlarged cross-sectional view showing a part of the intelligent reflecting surface RE according to the present embodiment.

As shown in FIG. 3, in the first substrate SUB1, an insulating layer 11, an insulating layer 12, an insulating layer 13, an insulating layer 14, an insulating layer 15, an insulating layer 16, an insulating layer 17, and an alignment film AL1 are formed on a basement 1 in this order. Each of the insulating layers 11 to 17 is formed of an inorganic insulating layer or an organic insulating layer. In the present embodiment, the insulating layer 16 is an organic insulating layer and is formed of, for example, resin.

Each of the insulating layers 11 to 15 and 17 is, for example, an inorganic insulating layer. The insulating layer 11 is formed of silicon oxide (SiO). The insulating layer 12 includes a lower layer formed of SiN and an upper layer formed of SiO. The insulating layer 13 is formed of SiO. The insulating layer 14 is formed of SiN. The insulating layer 15 is formed of SiO or SiN. The insulating layer 17 is formed of SiN.

The control line GL and a conductive layer CO1 are provided on the insulating layer 11 and covered with the insulating layer 12. A semiconductor layer SMC is provided on the insulating layer 12. The semiconductor layer SMC is stacked on the control line GL. The semiconductor layer SMC is formed of an oxide semiconductor (OS), which is a transparent semiconductor. Typical examples of oxide semiconductors include, for example, indium gallium zinc oxide (InGaZnO), indium gallium oxide (InGaO), indium zinc oxide (InZnO), zinc tin oxide (ZnSnO), zinc oxide (ZnO), transparent amorphous oxide semiconductor (TAOS), and the like. However, the semiconductor layer SMC is not limited to an oxide semiconductor, and may be formed of low-temperature polycrystalline silicon as amorphous silicon or polycrystalline silicon.

A conductive layer CO2 and a connection line layer CL1 are provided on the insulating layer 12 and the semiconductor layer SMC and covered with the insulating layer 13. The connection line layer CL1 is in contact with the conductive layer CO1 through a contact hole formed in the insulating layer 12. The conductive layer CO2 and the connection line layer CL1 are in contact with and electrically connected to the semiconductor layer SMC. One of an area of the semiconductor layer SMC to which the conductive layer CO2 is connected and an area to which the connection line layer CL1 is connected, is a source area, and the other is a drain area. Then, the semiconductor layer SMC includes a channel area between a source area and a drain area.

A gate electrode GE is provided on the insulating layer 13 and covered with the insulating layer 14. The gate electrode GE is electrically connected to the control line GL. The gate electrode GE overlaps with at least the channel area of the semiconductor layer SMC. The control line GL, the semiconductor layer SMC, the gate electrode GE, and the like constitute the switching element SW as a thin film transistor (TFT).

An area of the control line GL, which overlaps with the semiconductor layer SMC, functions as a gate electrode. For this reason, the switching element SW is a dual-gate TFT. However, the switching element SW may be a bottom-gate TFT or a top-gate TFT.

A conductive layer CO3 and the connection line layer CL2 are provided on the insulating layer 14 and covered with the insulating layer 15. The conductive layer CO3 is in contact with the gate electrode GE through a contact hole formed in the insulating layer 14. The connection line layer CL2 is in contact with the connection line layer CL1 through a contact hole formed in the insulating layers 13 and 14.

The insulating layer 16 and the insulating layer 17 are provided on the insulating layer 15 in this order. A patch electrode PE is provided on the insulating layer 17 and covered with the alignment film AL1. The patch electrode PE is in contact with the connection line layer CL2 through a contact hole formed in the insulating layers 15, 16, and 17.

A common electrode CE and an alignment film AL2 are provided in this order on a surface of a basement 2, which is opposed to the first substrate SUB1.

The control line GL, the conductive layers CO1, CO2, and CO3, the connection line layers CL1 and CL2, and the gate electrode GE are formed of metal as a low-resistance conductive material. The control line GL and the gate electrode GE may be formed of molybdenum (Mo), tungsten (W), or an alloy thereof. The connection line layers CL1 and CL2 may be formed of TAT or MAM.

As shown in FIG. 2 and FIG. 3, the plurality of patch electrodes PE can be individually driven by active matrix driving. For this reason, the plurality of patch electrodes PE can be driven independently. For example, the direction of the reflected wave w2 reflected on the intelligent reflecting surface RE can be used as a direction parallel to the X-Z plane or a direction parallel to the Y-Z plane.

Alternatively, the direction of the reflected wave w2 reflected on the intelligent reflecting surface RE can be used as a direction parallel to a third plane other than the X-Z plane and the Y-Z plane. Incidentally, the third plane is a plane defined by the Z-axis and a third axis other than the X-axis and the Y-axis in the X-Y plane. Since each of the patch electrodes PE can be driven independently, the degree of freedom of a reflection direction of a reflected wave w2 that the intelligent reflecting surface RE reflects can be increased.

Figure 4:
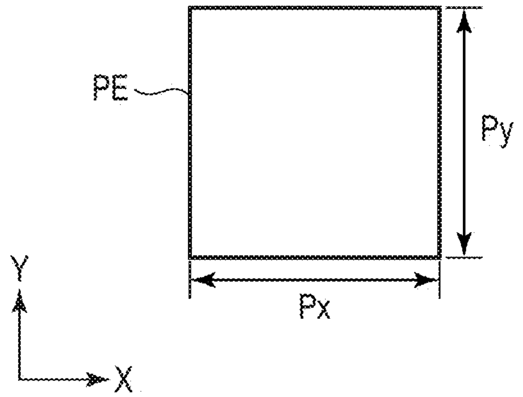
FIG. 4 is an enlarged plan view showing the patch electrode.

FIG. 4 is an enlarged plan view showing the patch electrode PE. As shown in FIG. 4, the patch electrode PE has a square shape. The shape of the patch electrode PE is not particularly limited, but a square or a perfect circle is desirable. When the external shape of the patch electrode PE is focused, a shape in which an aspect ratio of vertical and horizontal lengths is 1:1 is desirable. This is because it is desirable for the patch electrode PE to have a 90° rotationally symmetrical structure in order to accommodate horizontal polarization and vertical polarization.

The patch electrode PE has a length Px in a direction along the X-axis and a length Py in a direction along the Y-axis. The length Px and the length Py are desirably adjusted in accordance with the frequency range of the incident wave w1. Next, a desirable relationship between the frequency range of the incident wave w1 and the lengths Px and Py will be exemplified.

$$2.4\ \text{GHz}: Px=Py=35\ \text{mm}$$

$$5.0\ \text{GHz}: Px=Py=16.8\ \text{mm}$$

$$28\ \text{GHz}: Px=Py=3.0\ \text{mm}$$

Figure 5:
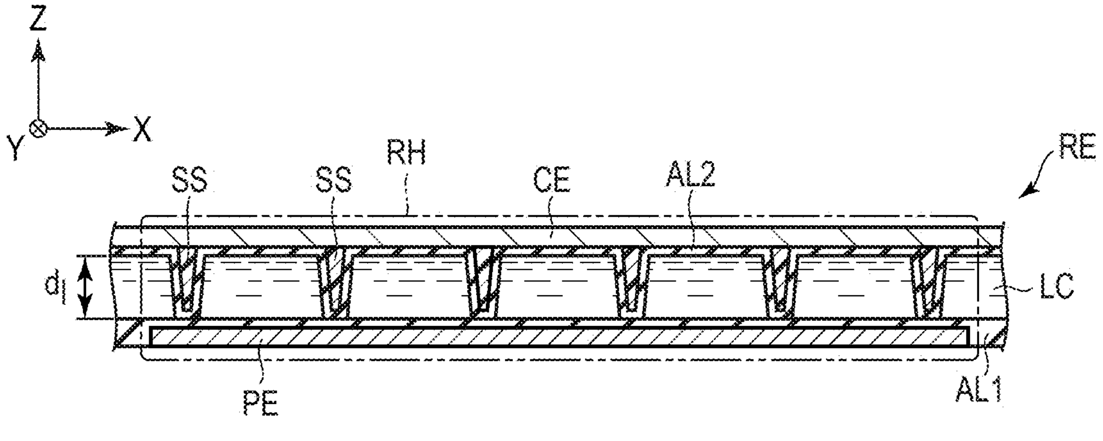
FIG. 5 is an enlarged cross-sectional view showing a part of the intelligent reflecting surface, illustrating a single reflection controller.

FIG. 5 is an enlarged cross-sectional view showing a part of the intelligent reflecting surface RE, illustrating a single reflection controller RH. In FIG. 5, illustration of the basement 1 and the like in FIG. 3 is omitted.

As shown in FIG. 5, a thickness $d_1$ (cell gap) of the liquid crystal layer LC is held by a plurality of spacers SS. In the present embodiment, the spacers SS are columnar spacers, formed in the second substrate SUB2, and protruding toward the first substrate SUB1 side.

The width of the spacer SS is 10 to 20 μm. While the length Px and the length Py of the patch electrode PE are on the order of mm, the width of the spacer SS is on the order of μm. For this reason, the plurality of spacers SS need to exist in the areas opposed to the patch electrodes PE. In addition, a ratio of the areas where the plurality of spacers SS exist, of the areas opposed to the patch electrodes PE is approximately 1%.

For this reason, even if the spacers SS exist in the above areas, the influence of the spacers SS on the reflected wave w2 is small. Incidentally, the spacers SS may be formed in the first substrate SUB1 to protrude toward the second substrate SUB2 side. Alternatively, the spacers SS may be spherical spacers.

The intelligent reflecting surface RE comprises a plurality of reflection controllers RH. Each reflection controller RH includes one patch electrode PE among the plurality of patch electrodes PE, a portion of the common electrode CE, which is opposed to the patch electrode PE, and an area of the liquid crystal layer LC, which is opposed to the patch electrode PE.

Figure 6:
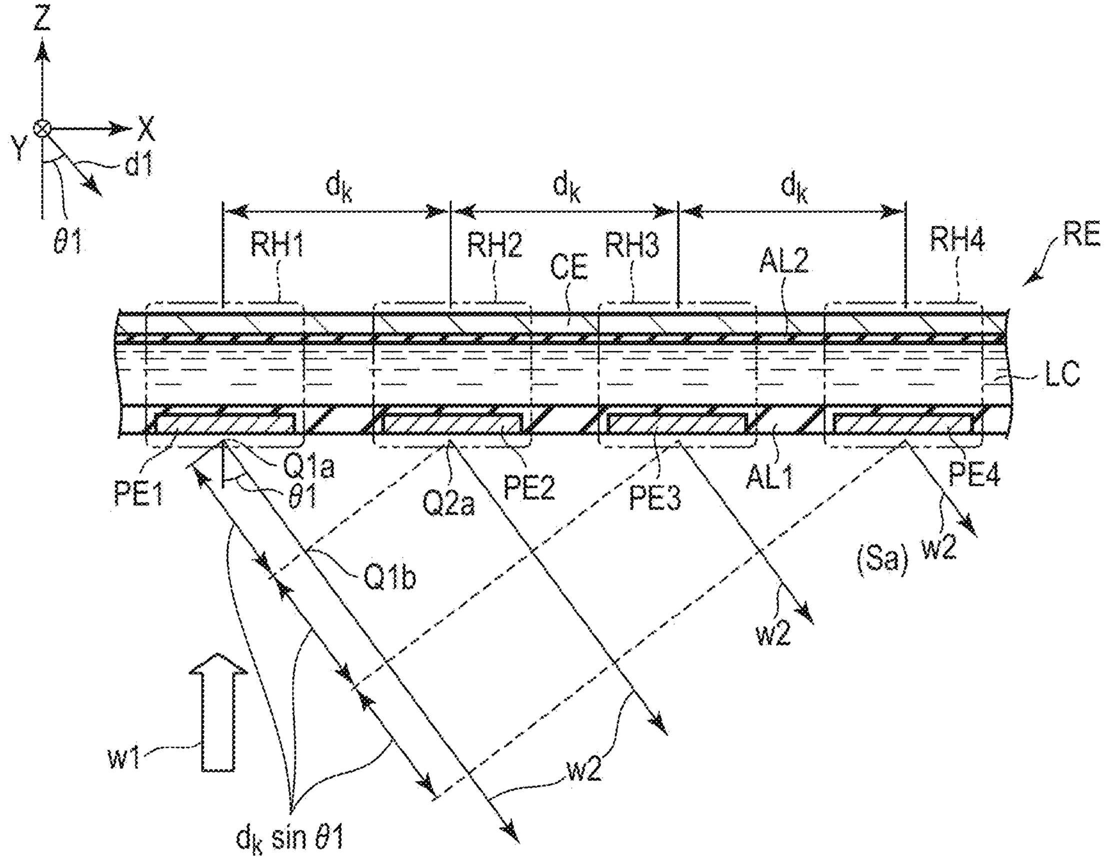
FIG. 6 is an enlarged cross-sectional view showing a part of the intelligent reflecting surface, illustrating a plurality of reflection controllers.

FIG. 6 is an enlarged cross-sectional view showing a part of the intelligent reflecting surface RE, illustrating a plurality of reflection controllers RH. In FIG. 6, illustration of the basement 1, the spacers SS, and the like is omitted.

As shown in FIG. 6, each of the reflection controllers RH functions to adjust the phase of the radio wave (incident wave w1) formed incident from the incidence surface Sa side in accordance with the voltage applied to the patch electrode PE, and urge the radio wave to be reflected to the incidence surface Sa side as the reflected wave w2. In each reflection controller RH, the reflected wave w2 is a synthetic wave of the radio wave reflected on the patch electrode PE and the radio wave reflected on the common electrode CE.

The patch electrodes PE are arranged at regular intervals in the direction along the X-axis. A length (pitch) between adjacent patch electrodes PE is referred to as $d_k$. The length $d_k$ corresponds to a distance from a geometric center of one patch electrode PE to a geometric center of the adjacent patch electrode PE. In the present embodiment, it is assumed that the reflected waves w2 have the same phase in the first reflection direction d1. On the X-Z plane of FIG. 6, the first reflection direction d1 is a direction forming a first angle θ1 with the Z axis. The first reflection direction d1 is parallel to the X-Z plane.

In order for the phases of the radio waves reflected on the plurality of reflection controllers RH to be aligned in the first reflection direction d1, the phases of the radio waves need only to be aligned on the linear two-dot chain line. For example, the phase of the reflected wave w2 at point Q1*b* and the phase of the reflected wave w2 at point Q2*a* may be aligned. A physical linear distance from point Q1*a* to point Q1*b* of the first patch electrode PE1 is $d_k \times \sin\theta 1$. For this reason, when the first reflection controller RH1 and the second reflection controller RH2 are focused, the phase of the reflected wave w2 from the second reflection controller RH2 may be delayed from the phase of the reflected wave w2 from the first reflection control section RH1 by a phase amount δ1. The phase amount δ1 is represented by the following expression.

$$\delta 1 = d_k \times \sin\theta 1 \times 2\pi/\lambda$$

Figure 7:
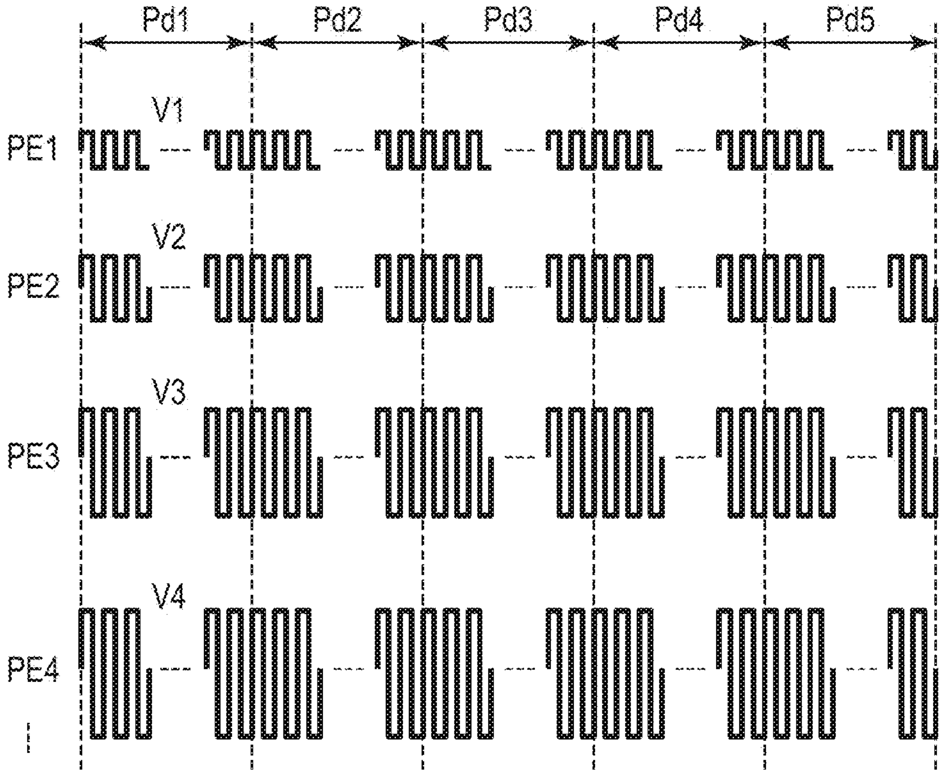
FIG. 7 is a timing chart showing changes in the voltage applied to the patch electrode for each period in a method of driving the intelligent reflecting surface of the first embodiment.

Next, a method of driving the intelligent reflecting surface RE will be described. FIG. 7 is a timing chart showing changes in the voltages applied to the patch electrodes PE for each period in the method of driving the intelligent reflecting surface RE of the present embodiment. FIG. 7 shows a first period Pd1 to a fifth period Pd5 of the driving periods of the intelligent reflecting surface RE.

As shown in FIG. 6 and FIG. 7, when driving the intelligent reflecting surface RE is started, voltages V are applied to a plurality of patch electrodes PE such that the radio waves reflected on the plurality of reflection controllers RH have the same phase in the first reflection direction d1 during the first period Pd1. For example, a first voltage V1 is applied to the first patch electrode PE1, a second voltage V2 is applied to the second patch electrode PE2, a third voltage V3 is applied to the third patch electrode PE3, and a fourth voltage V4 is applied to the fourth patch electrode PE4. An absolute value of the voltage V applied to each patch electrode PE is the same over the entire period Pd.

When the potential of the common electrode CE is referred to as a reference, the polarity of the voltage applied to each patch electrode PE is periodically reversed. For example, the patch electrode PE is driven with a drive frequency of 60 Hz. As described above, the patch electrodes PE are AC-driven.

Even if the period Pd changes to another period Pd, the phase amount δ1 of the radio wave reflected on one reflection controller RH in the first reflection direction d1 and the radio wave reflected on the adjacent reflection controller RH in the first reflection direction d1 is maintained. In the present embodiment, the phase amount δ1 is 35°. For this reason, a phase difference of 245° is assigned between the radio waves reflected on the first reflection controller RH1 including the first patch electrode PE1 in the first reflection direction d1 and the radio waves reflected on the eighth reflection controller RH8 including the eighth patch electrode PE8 in the first reflection direction d1.

First Example of First Embodiment

Figure 8:
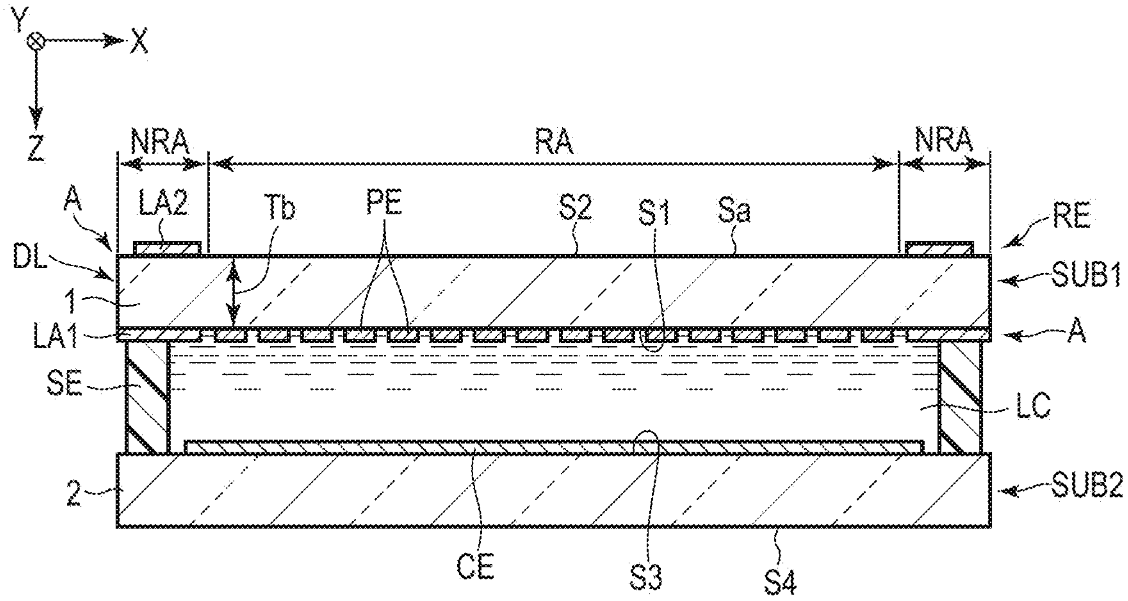
FIG. 8 is a cross-sectional view showing an intelligent reflecting surface according to a first example of the first embodiment.

Next, a first example of the first embodiment will be described. FIG. 8 is a cross-sectional view showing the intelligent reflecting surface RE according to a first example of the present embodiment. In the drawing, illustration of the alignment films AL1 and AL2 and the like is omitted.

As shown in FIG. 8, the basement 1 is located in the reflective area RA and the non-reflective area NRA. The basement 1 has a main surface S1 serving as a first main surface, and a main surface S2 serving as a second main surface. The main surface S2 is a surface on a side opposite to the main surface S1. The plurality of patch electrodes PE are located in the reflective area RA and opposed to the main surface S1. The main surface S2 functions as an incidence surface Sa. In the first example, the basement 1 is in contact with air and functions as a cover member. The basement 1 can be restated as a cover glass or a protective layer.

The basement 2 is located in the reflective area RA and the non-reflective area NRA. The basement 2 has a main surface S3 serving as a third main surface, and a main surface S4 serving as a fourth main surface. The main surface S3 is opposed to the main surface S1. The main surface S4 is a surface on a side opposite to the main surface S3. The common electrode CE is located in at least the reflective area RA and is provided between the first substrate SUB1 and the main surface S3. The common electrode CE is opposed to the plurality of patch electrodes PE in a direction parallel to the Z-axis.

The intelligent reflecting surface RE comprises a radar absorbent material A located in the non-reflective area NRA. In the first example, the radar absorbent material A is a λ/4 radar absorbent material. The radar absorbent material A includes the first conductive layer LA1, the second conductive layer LA2, and the dielectric layer DL. The second conductive layer LA2 is provided on the incidence surface Sa side on which a radio wave is made incident from the first conductive layer LA1. The second conductive layer LA2 is opposed to the first conductive layer LA1 in a direction parallel to the Z-axis. The dielectric layer DL is sandwiched between the first conductive layer LA1 and the second conductive layer LA2. The plurality of patch electrodes PE are located between the second substrate SUB2 and the incidence surface Sa.

The dielectric layer DL includes at least a basement 1. In example 1, the first conductive layer LA1 is located between the insulating layer 11 and the alignment film AL1. For this reason, the dielectric layer DL includes not only the basement 1, but also the insulating layer 11. A thickness of the dielectric layer DL is different from a thickness Tb of the basement 1, in the direction parallel to the Z-axis. In example 1, the thickness of the dielectric layer DL is greater than the thickness Tb. The thickness of the dielectric layer DL is equivalent to λ/4.

The first conductive layer LA1 is formed of metal. An electric resistance of the second conductive layer LA2 is higher than an electric resistance of the first conductive layer LA1. For example, the second conductive layer LA2 is formed of a conductive material having an electric resistance higher than that of the first conductive layer LA1. In example 1, the second conductive layer LA2 is formed of a transparent conductive material, for example, ITO. A resistance of the second conductive layer LA2 may be set to be equivalent to a resistance of an air layer. When a sheet resistance value is focused, it is suitable that the second conductive layer LA2 has a sheet resistance value which is substantially 376Ω/□ (ohms per square). Incidentally, the second conductive layer LA2 desirably has a sheet resistance value of 200 to 500Ω/□.

In addition, the second conductive layer LA2 may be formed of metal in a mesh state, for increase in resistance of the second conductive layer LA2.

The first conductive layer LA1 is electrically connected to the ground (GND), but may have the same potential as the common electrode CE. It is desirable that a voltage is not applied to the liquid crystal layer LC sandwiched between the common electrode CE and the first conductive layer LA1. Incidentally, the first conductive layer LA1 may be in an electrically floating state. The second conductive layer LA2 is in an electrically floating state.

As described above, the radar absorbent material A is constituted by the first conductive layer LA1, the second conductive layer LA2, and the dielectric layer DL. The radar absorbent material A can absorb a reflected wave which is reflected when an incident wave w1 is made incident. Unnecessary reflection in the non-reflective area NRA can be suppressed by providing the radar absorbent material A on the entire non-reflective area NRA. Interference of a regular reflected wave w2 from the reflective area RA of the intelligent reflecting surface RE with an undesired reflected wave from the non-reflective area NRA of the intelligent reflecting surface RE can be suppressed as compared to a case of not providing the radar absorbent material A on the intelligent reflecting surface RE. Therefore, the intelligent reflecting surface RE capable of suppressing the degradation in reflection characteristics can be obtained.

From the viewpoint of suppressing unnecessary reflection in the non-reflective area NRA, the drive circuit DR, and wires such as lead lines LE are desirably provided between the first conductive layer LA1 and the first alignment film AL1. Incidentally, insulating layers are interposed between the first conductive layer LA1 and the drive circuit DR and between the first conductive layer LA1 and the wires such as the lead lines LE. The radar absorbent material A can thereby desirably absorb the reflected wave.

However, the first conductive layer LA1 may be formed of the same material in the same layer as the patch electrodes PE. The first conductive layer LA1 is formed between the insulating layer 17 and the alignment film AL1. In this case, the drive circuit DR and the wires such as the lead lines LE may be provided between the basement 1 and the first conductive layer LA1, and the radar absorbent material A can absorb the reflected wave.

Second Example of First Embodiment

Figure 9:
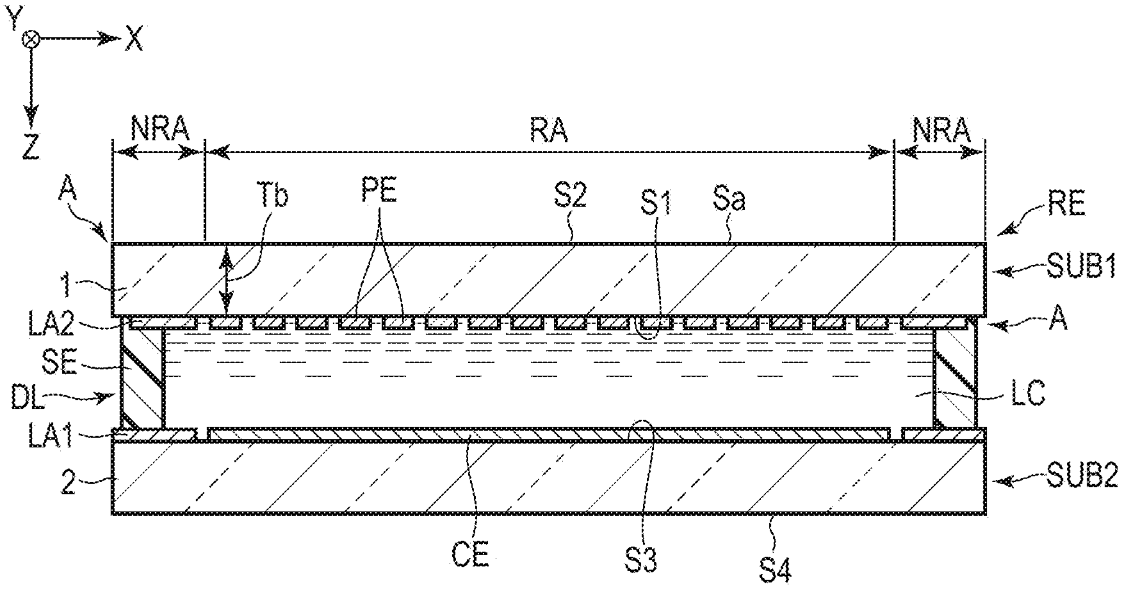
FIG. 9 is a cross-sectional view showing an intelligent reflecting surface according to a second example of the first embodiment.

Next, a second example of the first embodiment will be described. FIG. 9 is a cross-sectional view showing the intelligent reflecting surface RE according to the second example of the present embodiment. In the drawing, illustration of the alignment films AL1 and AL2 and the like is omitted.

As shown in FIG. 9, the position of the radar absorbent material A is different from the position of the radar absorbent material A of the first example, in the direction parallel to the Z-axis. The radar absorbent material A includes the first conductive layer LA1, the second conductive layer LA2, and the dielectric layer DL. The dielectric layer DL includes at least the liquid crystal layer LC. The dielectric layer DL further includes the sealing material SE.

In example 2, the first conductive layer LA1 is located between the basement 2 and the alignment film AL2. The second conductive layer LA2 is located between the basement 1 and the alignment film AL1. For this reason, the dielectric layer DL further includes the alignment films AL1 and AL2. A thickness of the dielectric layer DL is different from a thickness Tb of the basement 1, in the direction parallel to the Z-axis. In example 2, the thickness of the dielectric layer DL is smaller than the thickness Tb.

The first conductive layer LA1 is formed of metal. The first conductive layer LA1 may be formed of the same material in the same layer as the common electrode CE. In addition, the first conductive layer LA1 and the common electrode CE may be formed continuously and integrated.

An electric resistance of the second conductive layer LA2 is higher than an electric resistance of the first conductive layer LA1. In example 2, it is desirable that the second conductive layer LA2 is formed of ITO and has a sheet resistance value of 200 to 500Ω/□.

The first conductive layer LA1 is electrically connected to the ground (GND). The potential of the first conductive layer LA1 is substantially 0 V. The first conductive layer LA1 may be in an electrically floating state. Incidentally, when the first conductive layer LA1 and the common electrode CE are formed integrally, the potential of the first conductive layer LA1 is fixed to 0 V by applying a common voltage to the first conductive layer LA1. The second conductive layer LA2 is provided to be spaced from conductors such as the patch electrodes PE in an electrical insulation distance and is in an electrically floating state.

In the non-reflective area NRA, the liquid crystal layer LC is not driven by the first conductive layer LA1 or the second conductive layer LA2. For this reason, the dielectric constant of the dielectric layer DL is fixed.

The radar absorbent material A can absorb a reflected wave which is reflected when an incident wave w1 is made incident. Therefore, the intelligent reflecting surface RE capable of suppressing the degradation in reflection characteristics can be obtained.

The drive circuit DR, and the wires such as lead lines LE are desirably provided between the second conductive layer LA2 and the first alignment film AL1. Incidentally, insulating layers are interposed between the second conductive layer LA2 and the drive circuit DR and between the second conductive layer LA2 and the wires such as the lead lines LE. The radar absorbent material A can thereby desirably absorb the reflected wave.

However, the drive circuit DR and the wires such as the lead lines LE may be provided between the basement 1 and the second conductive layer LA2. The second conductive layer LA2 may be formed of the same material in the same layer as the patch electrodes PE. In this case, the radar absorbent material A can also absorb the reflected wave.

Third Example of First Embodiment

Figure 10:
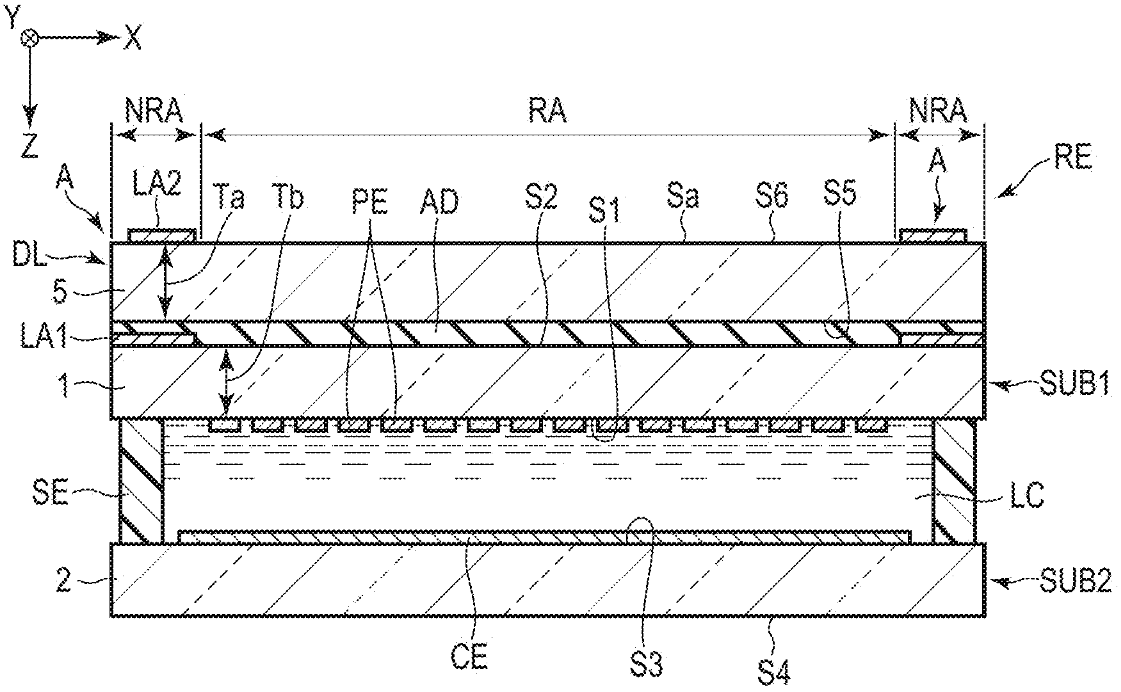
FIG. 10 is a cross-sectional view showing an intelligent reflecting surface according to a third example of the first embodiment.

Next, a third example of the first embodiment will be described. FIG. 10 is a cross-sectional view showing the intelligent reflecting surface RE according to a third example of the present embodiment. In the drawing, illustration of the alignment films AL1 and AL2 and the like is omitted.

As shown in FIG. 10, the position of the radar absorbent material A is different from the position of the radar absorbent material A of the first example and is also different from the position of the radar absorbent material A of the second example, in the direction parallel to the Z-axis. The radar absorbent material A is located on a side closer to the incidence surface Sa than to the first substrate SUB1. The intelligent reflecting surface RE further comprises a dielectric substrate 5. In the third example, the dielectric substrate 5 is a glass substrate. However, the dielectric substrate 5 may be formed of a dielectric other than glass, such as resin. The dielectric substrate 5 has a main surface S5 serving as a fifth main surface, and a main surface S6 serving as a sixth main surface. The main surface S5 is opposed to the main surface S2 of the basement 1. The main surface S6 is a surface on a side opposite to the main surface S5. The dielectric substrate 5 is adhered to a first substrate SUB1 by an adhesive layer AD.

In the third example, the dielectric substrate 5 is located in the reflective area RA and the non-reflective area NRA. The main surface S6 functions as the incidence surface Sa. The dielectric substrate 5 is located in not only the non-reflective area NRA, but also the reflective area RA. For this reason, the intelligent reflecting surface RE can obtain a flat surface (incidence surface Sa) as compared to a case where the dielectric substrate 5 is located in the non-reflective area NRA and is not located in the reflective area RA.

In the third example, the dielectric substrate 5 is in contact with air and functions as a cover member. The dielectric substrate 5 can be restated as a cover glass or a protective layer.

However, the dielectric substrate 5 of the third example may be located in at least the non-reflective area NRA and may not be located in the reflective area RA.

The radar absorbent material A includes the first conductive layer LA1, the second conductive layer LA2, and the dielectric layer DL. The dielectric layer DL includes at least the dielectric substrate 5. The dielectric layer DL further includes an adhesive layer AD.

In the third example, the first conductive layer LA1 is located between the basement 1 and the dielectric substrate 5. The second conductive layer LA2 is opposed to the main surface S6. The first conductive layer LA1 is formed on the main surface S2, and the second conductive layer LA2 is formed on the main surface S6. A thickness Ta of the dielectric layer DL may be the same as or different from a thickness Tb of the basement 1, in the direction parallel to the Z-axis. In example 3, the thickness Ta is greater than the thickness Tb.

The first conductive layer LA1 is formed of metal.

An electric resistance of the second conductive layer LA2 is higher than an electric resistance of the first conductive layer LA1. In example 3, it is desirable that the second conductive layer LA2 is formed of ITO and has a sheet resistance value of 200 to 500Ω/□.

The first conductive layer LA1 is electrically connected to the ground (GND). The potential of the first conductive layer LA1 is substantially 0 V. The first conductive layer LA1 may be in an electrically floating state. The second conductive layer LA2 is in an electrically floating state.

The radar absorbent material A can absorb a reflected wave which is reflected when an incident wave w1 is made incident. Therefore, the intelligent reflecting surface RE capable of suppressing the degradation in reflection characteristics can be obtained.

Figure 11:
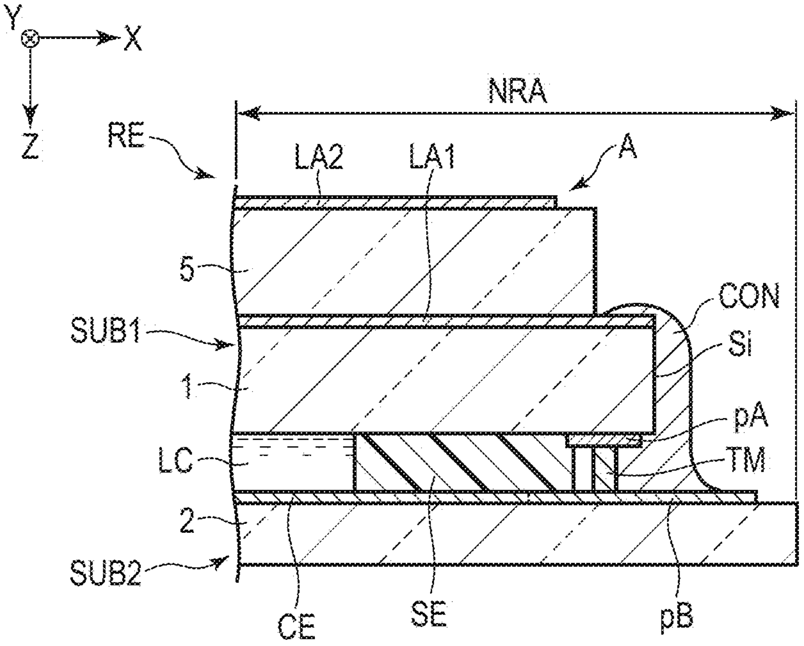
FIG. 11 is an enlarged cross-sectional view showing a part of the intelligent reflecting surface according to the third example of the first embodiment, illustrating first means for fixing a potential of a first conductive layer.
Figure 12:
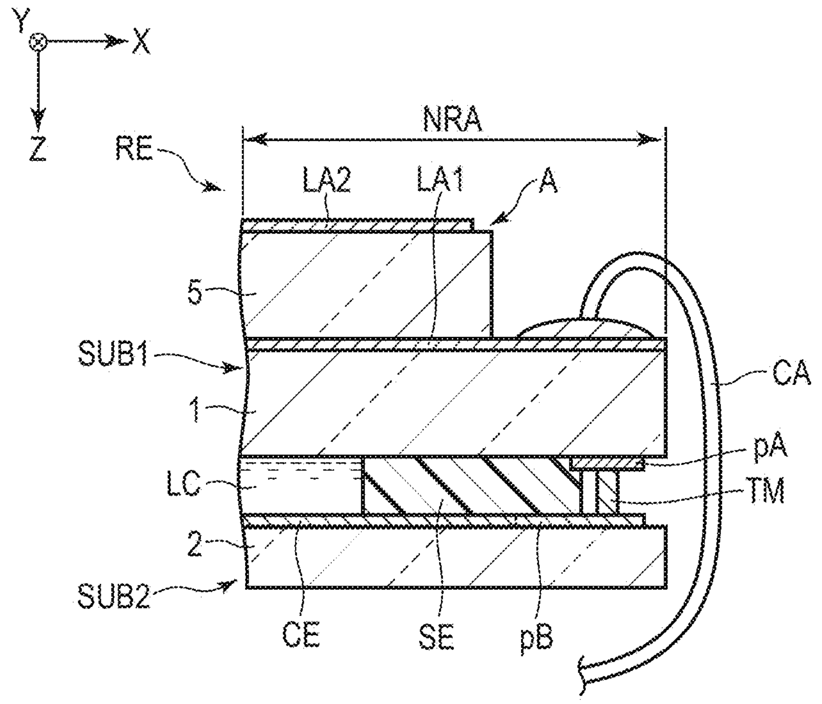
FIG. 12 is an enlarged cross-sectional view showing a part of the intelligent reflecting surface according to the third example of the first embodiment and a cable, illustrating second means for fixing the potential of the first conductive layer.

Next, means for fixing the potential of the first conductive layer LA1 will be described. FIG. 11 is an enlarged cross-sectional view showing a part of the intelligent reflecting surface RE according to the third example of the first embodiment, illustrating first means for fixing a potential of the first conductive layer LA1. FIG. 12 is an enlarged cross-sectional view showing a part of the intelligent reflecting surface RE according to the third example of the first embodiment and a cable CA, illustrating second means for fixing the potential of the first conductive layer LA1. FIG. 11 and FIG. 12 show only members necessary for the first substrate SUB1 and the second substrate SUB2, and illustration of the adhesive layer AD and the like of the intelligent reflecting surface RE is omitted.

As shown in FIG. 11, the first substrate SUB1 includes a power supply pad pA opposed to the main surface S1 of the basement 1. The second substrate SUB2 includes a power receiving pad pB opposed to the main surface S3 of the basement 2. The power receiving pad pB and the common electrode CE are formed continuously and integrated. The power supply pad pA and the power receiving pad pB are located outside the sealing material SE.

The intelligent reflecting surface RE further comprises a transfer TM. The transfer TM is located outside the sealing material SE and is arranged not to be in contact with the liquid crystal layer LC. The transfer TM is in contact with the power supply pad pA and the power receiving pad pB. Therefore, the power supply pad pA can apply a common voltage to the power receiving pad pB via the transfer TM.

The intelligent reflecting surface RE further comprises a conductive material CON. The conductive material CON can be restated as a connection line. The conductive material CON is in contact with each of the first conductive layer LA1, a side surface Si of the basement 1, the power supply pad pA, the transfer TM, and the power receiving pad pB, and electrically connects the first conductive layer LA1 with the power supply pad pA. The power supply pad pA can thereby apply a common voltage to the first conductive layer LA1 via at least the conductive material CON. Then, the first conductive layer LA1 can be substantially connected to the ground. Since the first means in FIG. 11 is the conductive material CON provided in the intelligent reflecting surface RE, the potential of the first conductive layer LA1 is fixed inside the intelligent reflecting surface RE.

As shown in FIG. 12, the cable CA may be connected to the intelligent reflecting surface RE. The cable CA is electrically connected to an area of the first conductive layer LA1, which is not covered with the dielectric substrate 5. The second means in FIG. 12 is the cable CA and can fix the potential of the first conductive layer LA1.

In addition, as understood from FIG. 11 and FIG. 12, the first conductive layer LA1 can be formed in an area which overlaps with the power supply pad pA and the transfer TM in the direction along the Z-axis, in example 3.

According to the first embodiment configured as described above, the intelligent reflecting surface RE comprises the radar absorbent material A. Unnecessary reflection in the non-reflective area NRA can be suppressed by the radar absorbent material A. Therefore, the intelligent reflecting surface RE capable of suppressing the degradation in reflection characteristics can be obtained. Then, the intelligent reflecting surface RE with excellent reflection characteristics can be obtained.

Next, a second embodiment will be explained. An intelligent reflecting surface RE of the second embodiment is constituted similarly to the above-described first embodiment except for constituent elements described in the second embodiment.

First Example of Second Embodiment

Figure 13:
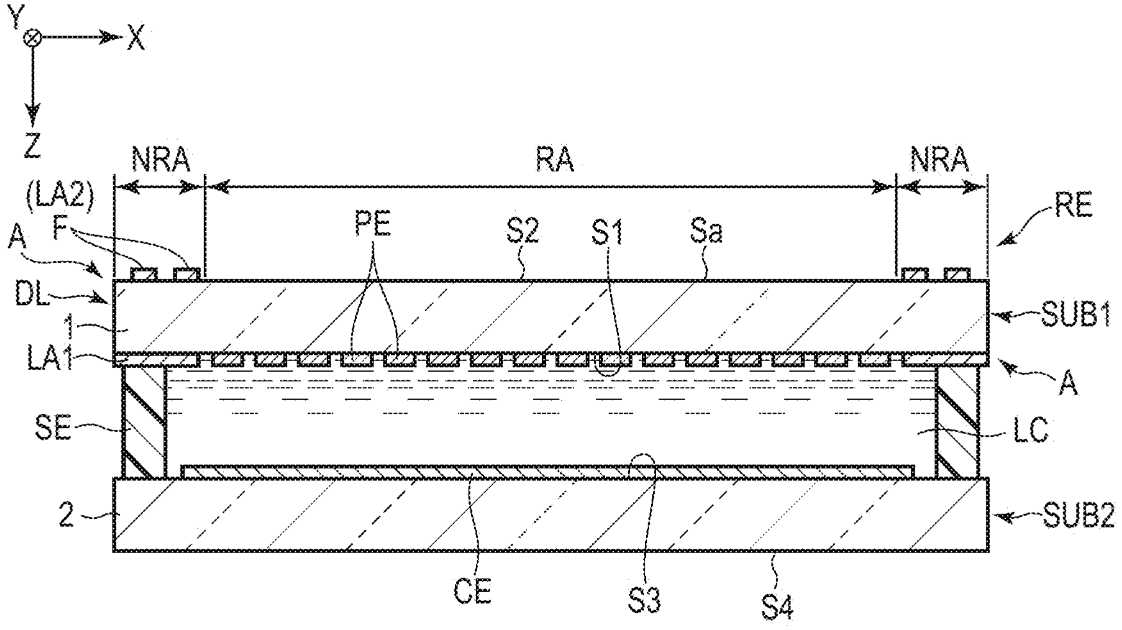
FIG. 13 is a cross-sectional view showing an intelligent reflecting surface according to a first example of a second embodiment.

First, a first example of the second embodiment will be described. FIG. 13 is a cross-sectional view showing the intelligent reflecting surface RE according to the first example of the second embodiment. In the drawing, illustration of the alignment films AL1 and AL2 and the like is omitted. Differences from the first example of the first embodiment will be described in the first example of the second embodiment.

As shown in FIG. 13, a radar absorbent material A includes a first conductive layer LA1, a second conductive layer LA2, and a dielectric layer DL. The first example is different from the first example of the first embodiment in structure of the second conductive layer LA2 of the radar absorbent material A. The second conductive layer LA2 includes a plurality of frequency selective surfaces F. The frequency selective surfaces F are formed of metal. In this case, the frequency selective surfaces F can restated as metal layers.

Figure 14:
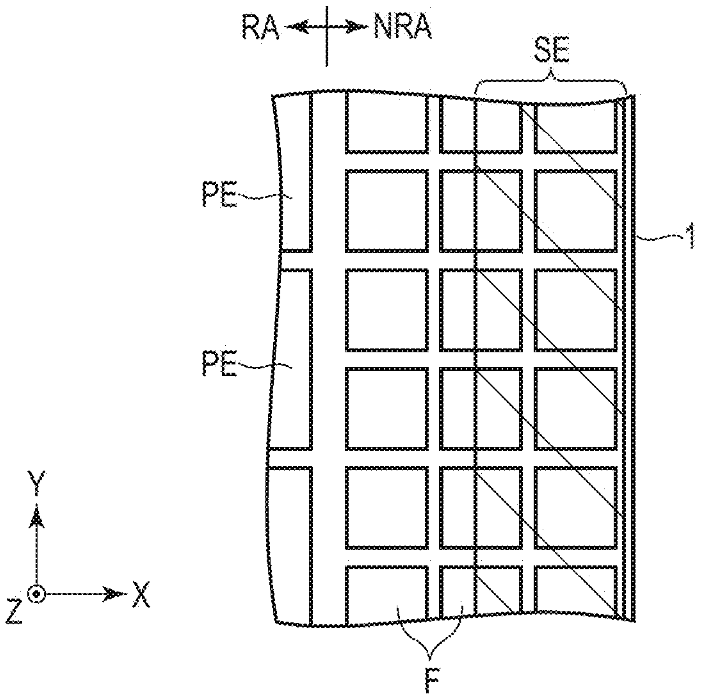
FIG. 14 is an enlarged cross-sectional view showing a part of the intelligent reflecting surface according to the first example of the second embodiment, illustrating a plurality of patch electrodes, a plurality of frequency selective surfaces, and a sealing material.

FIG. 14 is an enlarged cross-sectional view showing a part of the intelligent reflecting surface RE according to the first example of the second embodiment, illustrating a plurality of patch electrodes PE, a plurality of frequency selective surfaces F, and a sealing material SE. In the drawing, the sealing material SE is marked with right-downward diagonal lines.

As shown in FIG. 14, the plurality of frequency selective surfaces F are arranged in an island shape in the non-reflective area NRA. Each of the frequency selective surfaces F has at least one of a shape different from the shape of the patch electrodes PE and a size different from the size of the patch electrodes PE. In the first example, the frequency selective surface F has a shape (square) similar to the shape of the patch electrodes PE and a size smaller than the size of the patch electrodes PE. In addition, the plurality of frequency selective surfaces F have the same shape and the same size and are arranged along each of the X-axis and the Y-axis.

The plurality of frequency selective surfaces F are in an electrically floating state.

The arrangement of the plurality of frequency selective surfaces F, the shape of the frequency selective surfaces F, and the size of the frequency selective surfaces F are adjusted such that the reflection (unnecessary reflection) in the non-reflective area NRA can be further suppressed than the reflection (regular reflection) in the reflective area RA. The radar absorbent material A can thereby set the non-reflective area NRA as an area with a relatively low reflectance. Incidentally, the size of the frequency selective surfaces F may be larger than the size of the patch electrodes PE, and the unnecessary reflection in the non-reflective area NRA may be suppressed.

Incidentally, the plurality of frequency selective surfaces F may overlap with the sealing material SE in plan view.

Several modified examples of patterns of the plurality of frequency selective surfaces F will be described here.

Figure 15:
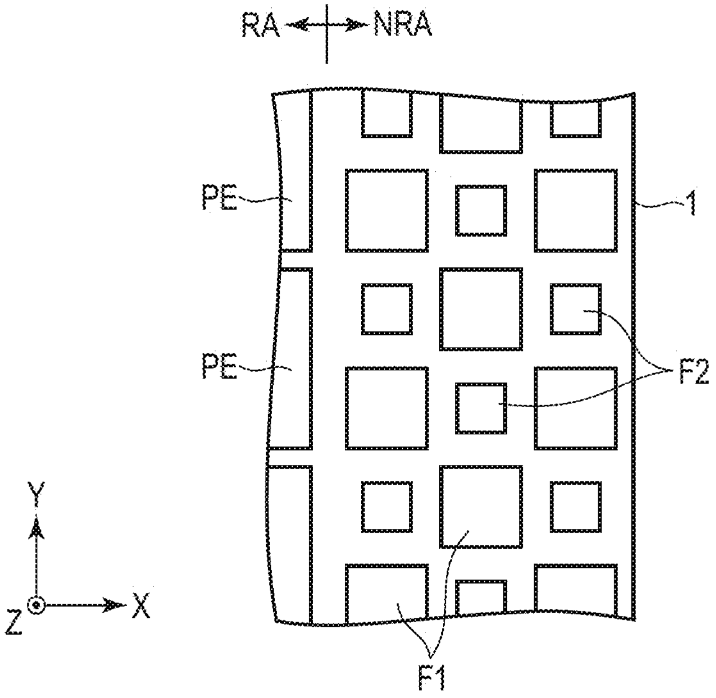
FIG. 15 is an enlarged cross-sectional view showing a first modified example of the plurality of frequency selective surfaces, illustrating a plurality of patch electrodes and a plurality of frequency selective surfaces.

As shown in FIG. 15, the plurality of frequency selective surfaces F may include plural types of frequency selective surfaces different in size. In the example shown in FIG. 15, the plurality of frequency selective surfaces F include two types of frequency selective surfaces F1 and F2 different in size.

Figure 16:
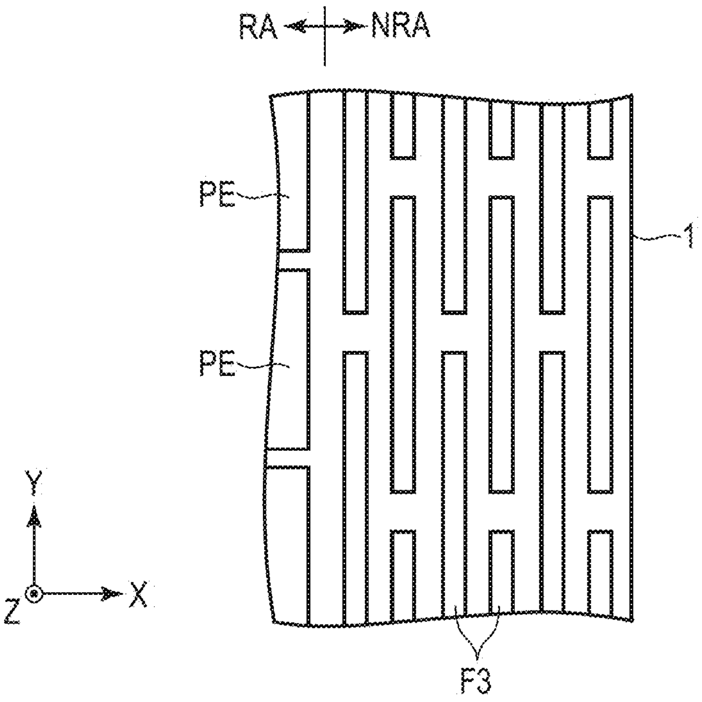
FIG. 16 is an enlarged cross-sectional view showing a second modified example of the plurality of frequency selective surfaces, illustrating a plurality of patch electrodes and a plurality of frequency selective surfaces.
Figure 17:
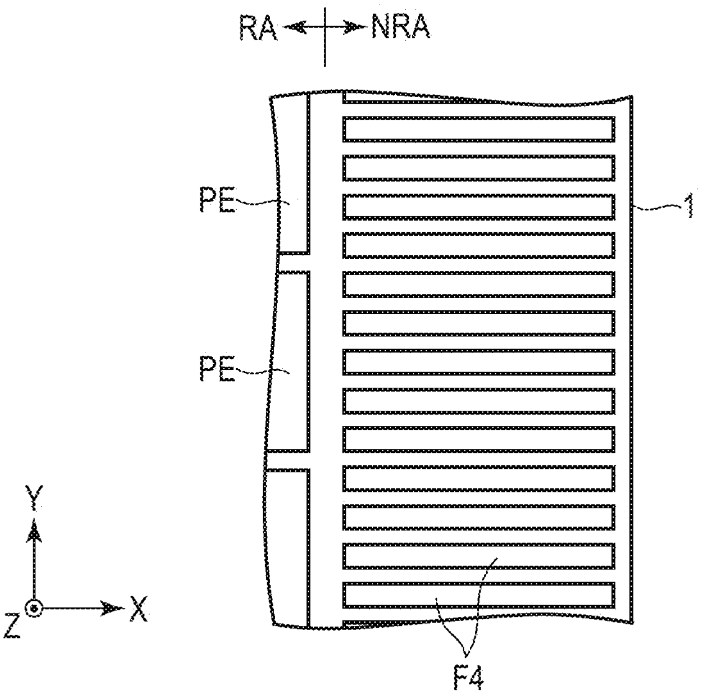
FIG. 17 is an enlarged cross-sectional view showing a third modified example of the plurality of frequency selective surfaces, illustrating a plurality of patch electrodes and a plurality of frequency selective surfaces.

As shown in FIG. 16, the frequency selective surface F may be a frequency selective surface F3 having a rectangular shape and extending along the Y-axis. Alternatively, as shown in FIG. 17, the frequency selective surface F may be a frequency selective surface F4 having a rectangular shape and extending along the X-axis.

Alternatively, the frequency selective surface F3 and the frequency selective surface F4 may be provided together in the non-reflective area NRA. For example, the frequency selective surface F3 may be arranged in a pair of areas of the non-reflective area NRA, which sandwich the reflective area RA in a direction along the X-axis, and the frequency selective surface F4 may be arranged in the other pair of areas of the non-reflective area NRA, which sandwich the reflective area RA in a direction along the Y-axis.

However, when the frequency selective surface F such as the frequency selective surface F3 or F4 does not have a shape asymmetric in rotation of 90°, the frequency selective surface F may have a length so as to have no sensitivity to both the vertical polarization and the horizontal polarization. In other words, no matter how the amplitude direction of the radio wave changes with respect to the intelligent reflecting surface RE, the shape and the size (length and the like) of the frequency selective surface F may be adjusted such that there is no point where the reflection intensity is increased in the non-reflective area NRA of the intelligent reflecting surface RE.

As described above, the radar absorbent material A is constituted by the first conductive layer LA1, a plurality of frequency selective surfaces F, and the dielectric layer DL. The radar absorbent material A can absorb a reflected wave which is reflected when an incident wave w1 is made incident. Unnecessary reflection in the non-reflective area NRA can be suppressed by providing the radar absorbent material A on the entire non-reflective area NRA.

Incidentally, the frequency selective surfaces F may be formed of not only metal, but also a transparent conductive material such as ITO. However, when the material of the frequency selective surfaces F changes to ITO, the size of the frequency selective surfaces F also need to be changed. For this reason, the size of the frequency selective surfaces F may be determined appropriately so as to be able to suppress the reflection in the non-reflective area NRA.

Second Example of Second Embodiment

Figure 18:
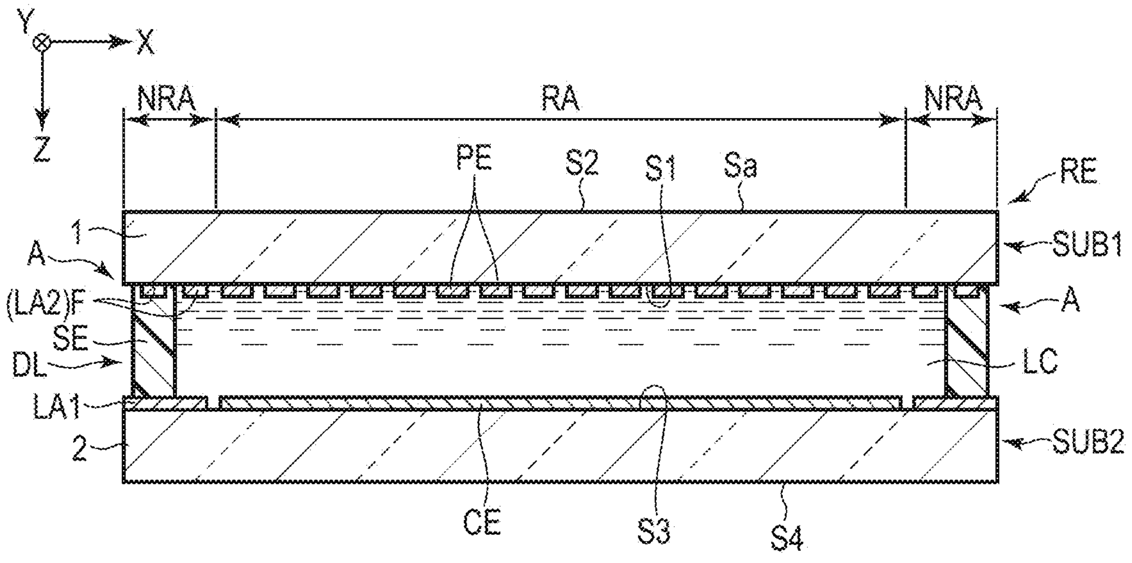
FIG. 18 is a cross-sectional view showing an intelligent reflecting surface according to a second example of the second embodiment.

Next, a second example of the second embodiment will be described. FIG. 18 is a cross-sectional view showing the intelligent reflecting surface RE according to the second example of the second embodiment. In the drawing, illustration of the alignment films AL1 and AL2 and the like is omitted. Differences from the first example of the second embodiment and the second example of the first embodiment will be described in the second example of the second embodiment.

As shown in FIG. 18, the radar absorbent material A includes the first conductive layer LA1, the second conductive layer LA2, and the dielectric layer DL. The second conductive layer LA2 includes a plurality of frequency selective surfaces F. The radar absorbent material A can absorb a reflected wave which is reflected when an incident wave w1 is made incident. Therefore, the intelligent reflecting surface RE capable of suppressing the degradation in reflection characteristics can be obtained.

Third Example of Second Embodiment

Figure 19:
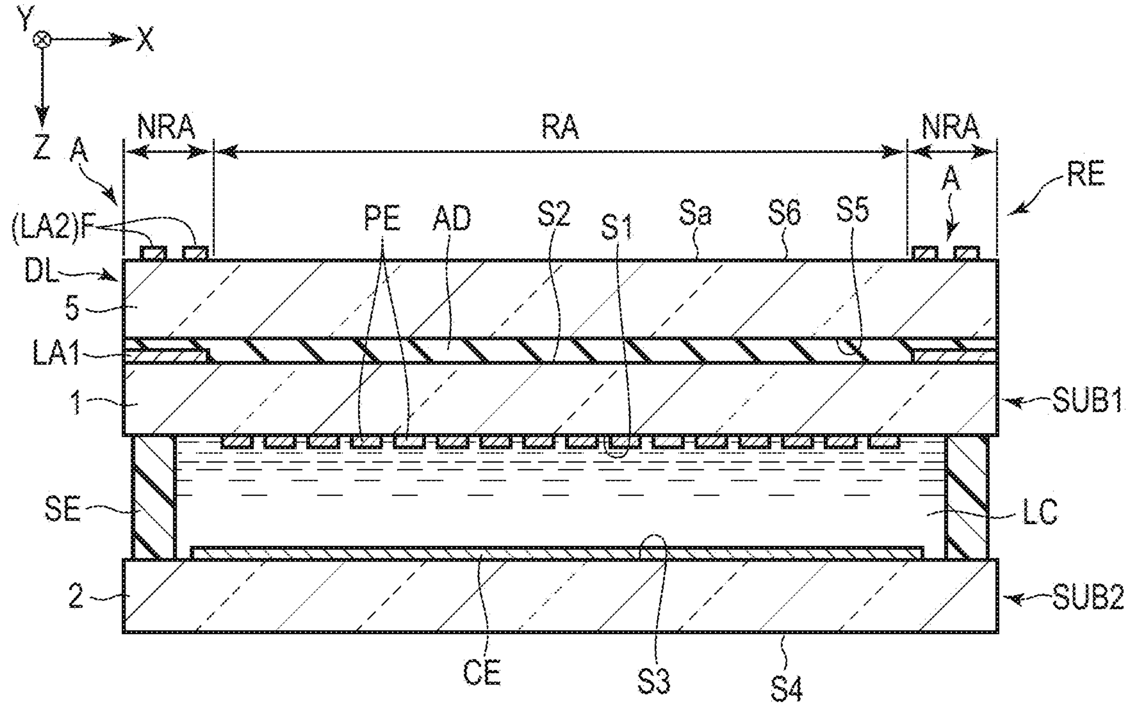
FIG. 19 is a cross-sectional view showing an intelligent reflecting surface according to a third example of the second embodiment.

Next, a third example of the second embodiment will be described. FIG. 19 is a cross-sectional view showing the intelligent reflecting surface RE according to the third example of the second embodiment. In the drawing, illustration of the alignment films AL1 and AL2 and the like is omitted. Differences from the first example of the second embodiment and the third example of the first embodiment will be described in the third example of the second embodiment.

As shown in FIG. 19, the radar absorbent material A includes the first conductive layer LA1, the second conductive layer LA2, and the dielectric layer DL. The second conductive layer LA2 includes a plurality of frequency selective surfaces F. The intelligent reflecting surface RE capable of suppressing the degradation in reflection characteristics can also be obtained in the third example.

The same advantages as those of the above-described first embodiment can also be obtained from the second embodiment configured as described above.

Next, a third embodiment will be described. An intelligent reflecting surface RE of the third embodiment is constituted similarly to the above-described first embodiment except for constituent elements described in the third embodiment.

First Example of Third Embodiment

Figure 20:
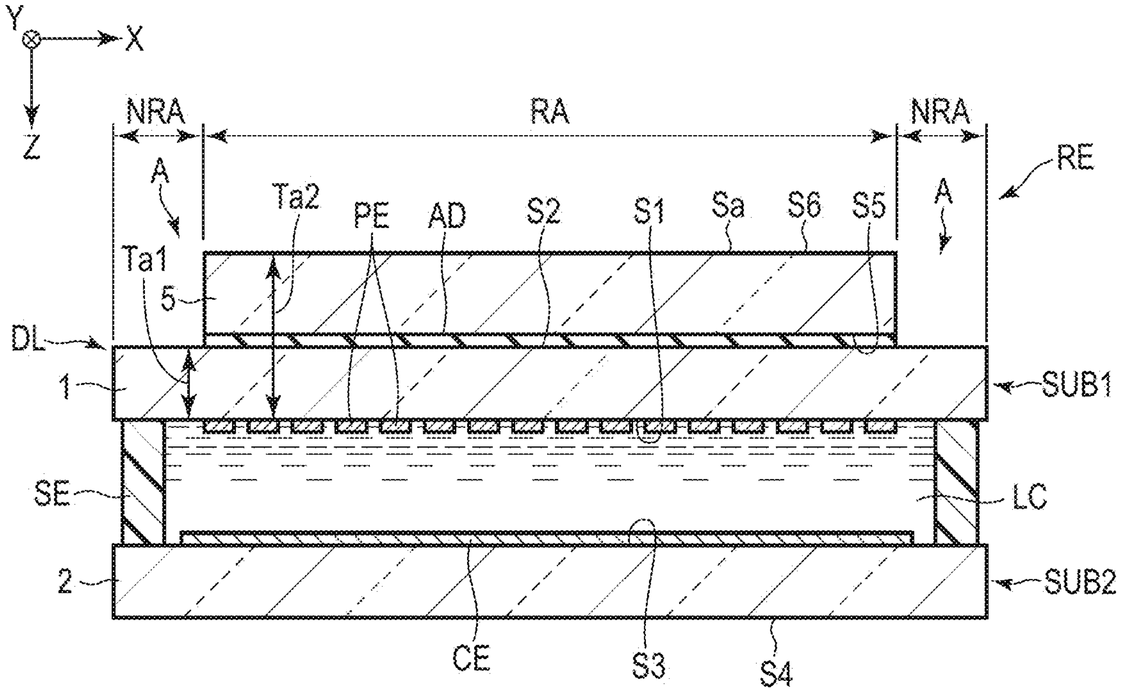
FIG. 20 is a cross-sectional view showing an intelligent reflecting surface according to a first example of a third embodiment.

First, a first example of the third embodiment will be described. FIG. 20 is a cross-sectional view showing an intelligent reflecting surface RE according to the first example of the third embodiment. In the drawing, illustration of the alignment films AL1 and AL2 and the like is omitted. Differences from the first example of the first embodiment (FIG. 8) will be described in the first example of the third embodiment.

As shown in FIG. 20, a radar absorbent material A comprises a dielectric layer DL, but does not comprise a first conductive layer LA1 and a second conductive layer LA2. The intelligent reflecting surface RE further comprises a dielectric substrate 5. In the first example, the dielectric substrate 5 is a glass substrate. However, the dielectric substrate 5 may be formed of a dielectric other than glass, such as resin. The dielectric substrate 5 has a main surface S5 and a main surface S6. The dielectric substrate 5 is adhered to a first substrate SUB1 by an adhesive layer AD.

The dielectric layer DL is located in a reflective area RA and a non-reflective area NRA. The dielectric layer DL includes at least a basement 1. The dielectric layer DL is provided between a main surface S1 and an incidence surface Sa of the basement 1. In the first example, the dielectric layer DL includes not only the basement 1, but also the adhesive layer AD and the dielectric substrate 5.

A plurality of patch electrodes PE are located between a second substrate SUB2 and the incidence surface Sa. The radar absorbent material A includes a portion of the dielectric layer DL, which is located in the non-reflective area NRA. A thickness Ta1 of the dielectric layer DL in the non-reflective area NRA is different from a thickness Ta2 of the dielectric layer DL in the reflective area RA, in the direction parallel to the Z-axis.

In the third example, the dielectric substrate 5 is located in the reflective area RA and is not located in the non-reflective area NRA. For this reason, the thickness Ta1 is smaller than the thickness Ta2. In the reflective area RA, the main surface S6 functions as the incidence surface Sa.

The thickness Ta2 is set such that an amplitude of a regular reflected wave w2 from the reflective area RA of the intelligent reflecting surface RE becomes great. The thickness Ta1 is different from the thickness Ta2 such that an amplitude of an undesired reflected wave from the non-reflective area NRA of the intelligent reflecting surface RE becomes relatively small. The radar absorbent material A can absorb a reflected wave which is reflected when an incident wave w1 is made incident. Unnecessary reflection in the non-reflective area NRA can be suppressed by providing the radar absorbent material A on the entire non-reflective area NRA. Therefore, the intelligent reflecting surface RE capable of suppressing the degradation in reflection characteristics can be obtained.

Second Example of Third Embodiment

Figure 21:
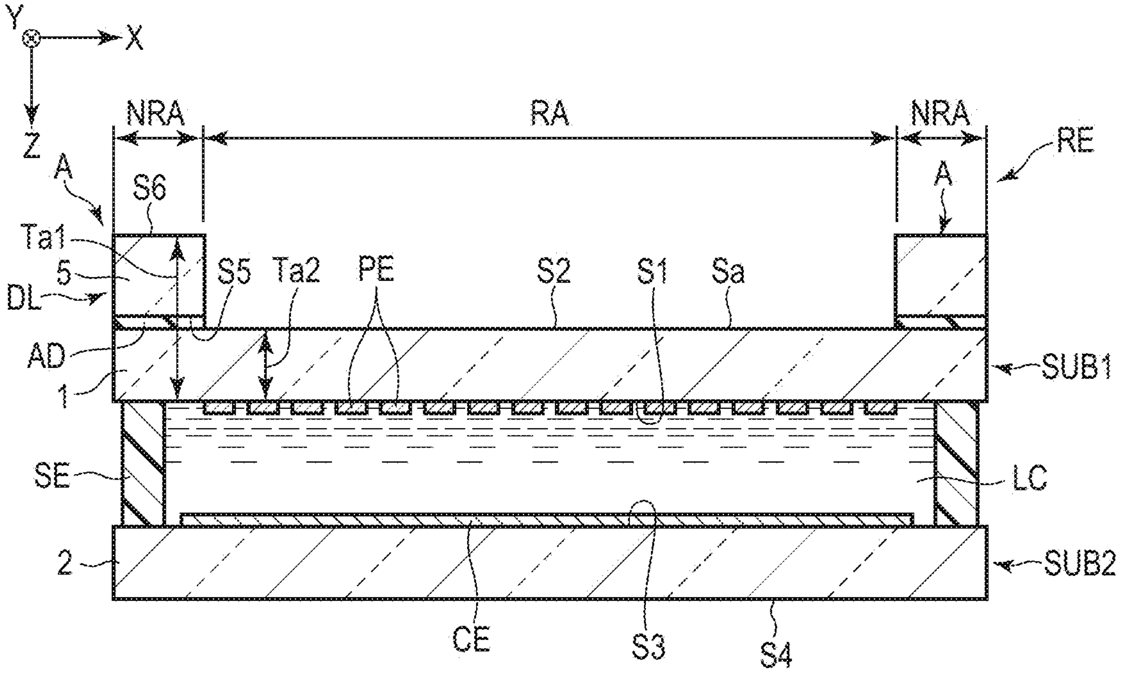
FIG. 21 is a cross-sectional view showing an intelligent reflecting surface according to a second example of the third embodiment.

Next, a second example of the third embodiment will be described. FIG. 21 is a cross-sectional view showing an intelligent reflecting surface RE according to the second example of the third embodiment. In the drawing, illustration of the alignment films AL1 and AL2 and the like is omitted. Differences from the first example of the third embodiment will be described in the second example of the third embodiment.

As shown in FIG. 21, the second example is different from the first example in position of the dielectric substrate 5. The dielectric substrate 5 is located in the non-reflective area NRA and is not located in the reflective area RA. For this reason, the thickness Ta1 is greater than the thickness Ta2. In the reflective area RA, a main surface S2 functions as the incidence surface Sa.

The thickness Ta2 is set such that an amplitude of a regular reflected wave w2 from the reflective area RA of the intelligent reflecting surface RE becomes great. The thickness Ta1 is different from the thickness Ta2 such that an amplitude of an undesired reflected wave from the non-reflective area NRA of the intelligent reflecting surface RE becomes relatively small. The radar absorbent material A comprises a dielectric layer DL located in the non-reflective area NRA and can absorb the reflected wave which is reflected when the incident wave w1 is made incident. Unnecessary reflection in the non-reflective area NRA can be suppressed by providing the radar absorbent material A on the entire non-reflective area NRA. Therefore, the intelligent reflecting surface RE capable of suppressing the degradation in reflection characteristics can be obtained.

The same advantages as those of the above-described first embodiment can also be obtained from the third embodiment configured as described above. The thickness Ta2 in the first example (FIG. 20) and the thickness Ta1 in the second example (FIG. 21) can be adjusted to desired examples by adjusting the thickness of the dielectric substrate 5. In addition, the intelligent reflecting surface RE may comprise a plurality of dielectric substrates including the dielectric substrate 5. In this case, the thicknesses Ta1 and Ta2 can be adjusted by a plurality of dielectric substrates and the like.

Fourth Embodiment

Figure 22:
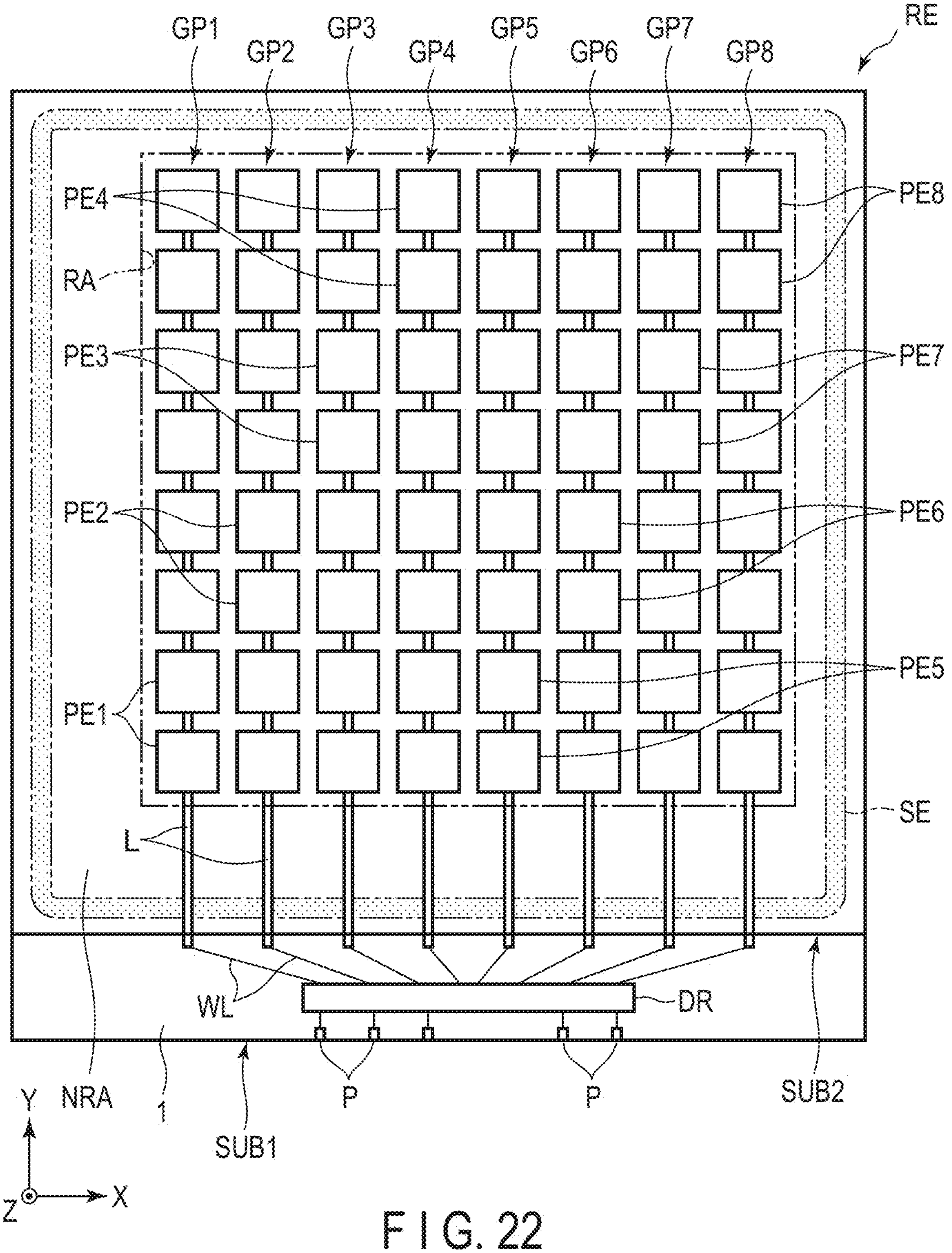
FIG. 22 is a plan view showing an intelligent reflecting surface according to a fourth embodiment.

Next, a fourth embodiment will be described. An intelligent reflecting surface RE of the fourth embodiment is constituted similarly to the above-described first to third embodiments except for constituent elements described in the fourth embodiment. FIG. 22 is a plan view showing the intelligent reflecting surface RE according to the fourth embodiment.

As shown in FIG. 22, the first substrate SUB1 includes connection lines L and wiring lines WL instead of a plurality of signal lines SL, a plurality of control lines GL, a plurality of switching elements SW, a drive circuit DR, and a plurality of lead lines LE. The plurality of patch electrodes PE are included in a plurality of patch electrode groups GP extending along the Y-axis and arranged along the X-axis. The plurality of patch electrode groups GP include a first patch electrode group GP1 to an eighth patch electrode group GP8.

The first patch electrode group GP1 includes a plurality of first patch electrodes PE1, the second patch electrode group GP2 includes a plurality of second patch electrodes PE2, the third patch electrode group GP3 includes a plurality of third patch electrodes PE3, the fourth patch electrode group GP4 includes a plurality of fourth patch electrodes PE4, the fifth patch electrode group GP5 includes a plurality of fifth patch electrodes PE5, the sixth patch electrode group GP6 includes a plurality of sixth patch electrodes PE6, the seventh patch electrode group GP7 includes a plurality of seventh patch electrodes PE7, and the eighth patch electrode group GP8 includes a plurality of eighth patch electrodes PE8. For example, the second patch electrode PE2 is located between the first patch electrode PE1 and the third patch electrode PE3 in the direction along the X-axis.

Each patch electrode group GP includes a plurality of patch electrodes PE arranged along the Y-axis and electrically connected to each other. In the present embodiment, the plurality of patch electrodes PE of each patch electrode group GP are electrically connected by connection lines L. The first substrate SUB1 includes the plurality of connection lines L extending along the Y-axis and arranged along the X-axis. The connection lines L extend to an area of the basement 1, which is not opposed to the second substrate SUB2. Unlike the present embodiment, the plurality of connection lines L may be connected to the plurality of patch electrodes PE in one-to-one relationship.

Each of the wiring lines WL connects one connection line L with the drive circuit DC.

In the present embodiment, the plurality of patch electrodes PE arranged along the Y-axis, the connection line L, and the wiring line WL are integrally formed of the same conductor. Incidentally, the plurality of patch electrodes PE, the connection lines L, and the wiring lines WL may be formed of conductors different from each other.

The connection line L is a fine wire, and a width of the connection line L is sufficiently smaller than a length Px.

The width of the connection line L is several μm to several tens of μm, and is on the order of μm. If the width of the connection line L is made too large, the sensitivity to the frequency component of the radio waves is changed, which is not desirable.

In the present embodiment, the direction of the reflected wave w2 reflected by the intelligent reflecting surface RE is a direction parallel to the X-Z plane.

Figure 23:
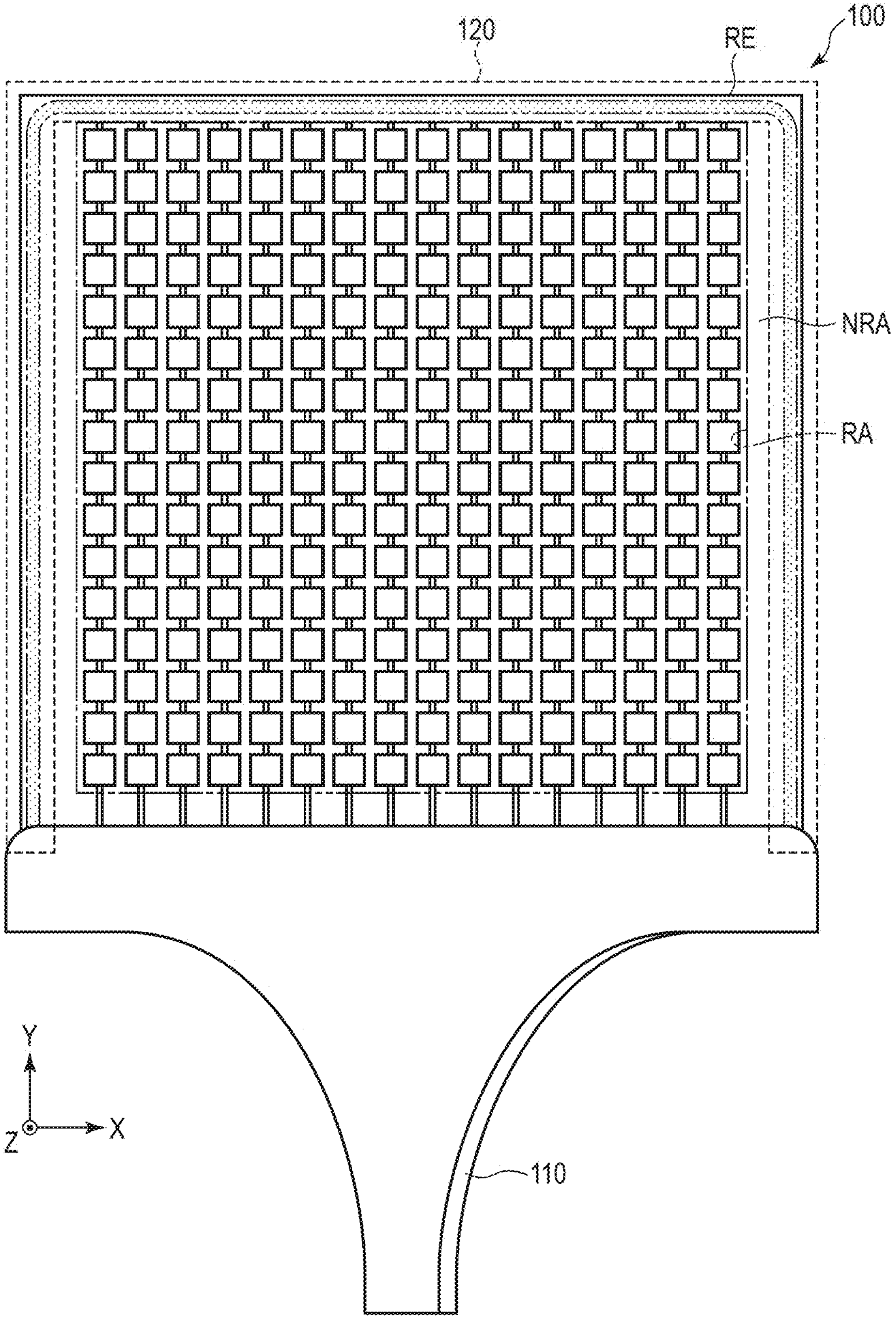
FIG. 23 is a perspective view showing a reflecting device according to the fourth embodiment.

FIG. 23 is a perspective view showing a reflecting device 100 according to the fourth embodiment. In the drawing, a frame 120 is represented by a broken line. As shown in FIG. 23, the reflecting device 100 comprises an intelligent reflecting surface RE, a support member 110, and a frame 120.

The support member 110 supports the intelligent reflecting surface RE. The support member 110 is a leg of the reflecting device 100 and is fixed to an installation surface. The support member 110 is desirably formed of an insulator so as not to reflect a radio wave accidentally. Incidentally, when a metal layer (metallic portion) exists in the support member 110, a radio wave is reflected by the metal layer. For this reason, it is undesirable to provide a metal layer in the support member 110.

A frame 120 surrounds a peripheral edge of the intelligent reflecting surface RE to protect the peripheral edge of the intelligent reflecting surface RE. The frame 120 is desirably formed of an insulator, similarly to the support member 110. Incidentally, the reflecting device 100 may comprise the frame 120 as needed.

The frame 120 may have a radio wave absorption ability. The frame 120 may constitute a part of the radar absorbent material A. Alternatively, the frame 120 may function as a radar absorbent material other than the radar absorbent material A. In this case, the radar absorbent material A may be located between the reflective area RA and the frame 120 in plan view.

Alternatively, the frame 120 may not have a radio wave absorption ability. In this case, the radar absorbent material A may also be located between the reflective area RA and the frame 120 in plan view.

The same advantages as those of the above-described first to third embodiments can also be obtained from the fourth embodiment configured as described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An intelligent reflecting surface comprising:

a first substrate having a first surface and a second surface opposite to the first surface;

a second substrate having a third surface and a fourth surface opposite to the third surface;

a sealing material bonding the first substrate with the second substrate;

a liquid crystal layer held between the first substrate and the second substrate and surrounded by the sealing material;

a plurality of patch electrodes on the first surface, the plurality of patch electrodes arrayed in a matrix;

a common electrode on the third surface, the common electrode overlapping with the plurality of patch electrodes, and a radio wave absorber, wherein the sealing material is located so as to surround the plurality of patch electrodes in a plan view, and the radio wave absorber overlaps with the sealing material, and does not overlap with the plurality of patch electrodes.

2. The intelligent reflecting surface according to claim 1, wherein an intensity of a reflected wave for a radio wave made incident on a surface of the radio wave absorber serving as a reflected surface is smaller than an intensity of a reflected wave for a radio wave made incident on the plurality of patch electrodes serving as a reflected surface.

3. The intelligent reflecting surface according to claim 1, wherein the radio wave absorber includes:

a first conductive layer;

a second conductive layer; and a dielectric layer between the first conductive layer and the second conductive layer.

4. The intelligent reflecting surface according to claim 3, wherein the first conductive layer is located on the first surface, the second conductive layer is located on the second surface, and the dielectric layer comprises a part of the first substrate.

5. The intelligent reflecting surface according to claim 3, wherein the first conductive layer is located on the first surface, the second conductive layer is located on the third surface, and the dielectric layer comprises a part of the sealing material.

6. The intelligent reflecting surface according to claim 3, further comprising:

a third substrate having a fifth surface and a sixth surface opposite to the fifth surface, wherein the third substrate is located so that the fifth surface and the second surface are faced each other at the second surface side of the first substrate, the first conductive layer is located on the second surface, the second conductive layer is located on the sixth surface, and the dielectric layer comprises a part of the third substrate.

7. The intelligent reflecting surface according to claim 3, wherein the first conductive layer is electrically connected to the ground or is in an electrically floating state, and the second conductive layer is in an electrically floating state.

8. The intelligent reflecting surface according to claim 3, wherein at least one of the first conductive layer and the second conductive layer comprises a plurality of frequency selective surfaces, each of the plurality of patch electrodes has a same shape and a same size each other, and each of the plurality of frequency selective surfaces has a different shape or a different size from the one of the plurality of patch electrodes.

9. The intelligent reflecting surface according to claim 1, wherein the radio wave absorber includes:

a first dielectric layer; and a second dielectric layer, the second dielectric layer is located on the second surface, the first dielectric layer comprises a part of the first substrate, and the second dielectric layer overlaps with the seal material, and does not overlap with the plurality of patch electrodes.

10. The intelligent reflecting surface according to claim 9, wherein a total thickness of the first dielectric layer and the second dielectric layer is greater than a thickness of the first substrate.

* * * * *